(12) United States Patent
Faris et al.

(10) Patent No.: US 6,299,997 B1
(45) Date of Patent: Oct. 9, 2001

(54) IONICALLY-CONDUCTIVE BELT STRUCTURE FOR USE IN A METAL-AIR FUEL CELL BATTERY SYSTEM AND METHOD OF FABRICATING THE SAME

(75) Inventors: Sadeg M. Faris, Pleasantville; Tsepin Tsai, Peekskill; Thomas J. Legbandt, Brooklyn, all of NY (US); Wayne Yao, Bergenfield, NJ (US); Muguo Chen, West Harrison, NY (US)

(73) Assignee: Reveo, Inc., Elmsford, NY (US)

( * ) Notice: Subject to any disclaimer, the term of this patent is extended or adjusted under 35 U.S.C. 154(b) by 0 days.

(21) Appl. No.: 09/110,762

(22) Filed: Jul. 3, 1998

Related U.S. Application Data

(63) Continuation-in-part of application No. 09/074,337, filed on May 7, 1998, and a continuation-in-part of application No. 08/944,507, filed on Oct. 6, 1997.

(51) Int. Cl.$^7$ .......................... H01M 2/38; H01M 12/06
(52) U.S. Cl. ................ 429/27; 429/68; 429/127
(58) Field of Search ................ 429/27, 68, 127; 29/623.5

(56) References Cited

U.S. PATENT DOCUMENTS

| | | |
|---|---|---|
| 3,252,838 | 5/1966 | Huber et al. . |
| 3,260,620 * | 7/1966 | Gruber ........................ 429/127 |
| 3,357,864 | 12/1967 | Huber . |
| 3,432,354 | 3/1969 | Jost . |
| 3,436,270 | 4/1969 | Oswin et al. . |
| 3,454,429 | 7/1969 | Gruber . |

(List continued on next page.)

FOREIGN PATENT DOCUMENTS

| | | | |
|---|---|---|---|
| 1176488 | 1/1970 | (GB) | ............... H01M/29/02 |

OTHER PUBLICATIONS

Fabrication of Thin–Film LIMN2O4 Cathodes for Rechargeable Microbateries by F.K. Shokoohi, et al., Applied Physics Letters, 1991, p. 1260–1262.

Battery Chargers by Mike Allen, Popular Mechanics, 1991, p. 30–31 (Sep.).

(List continued on next page.)

Primary Examiner—Stephen Kalafut
(74) Attorney, Agent, or Firm—Thomas J. Perkowski, Esq.; Ralph J. Crispino, Esq.

(57) ABSTRACT

In an air-metal fuel cell battery (FCB) system, wherein metal-fuel tape, the ionically-conductive medium and the cathode structures are transported at substantially the same velocity at the locus of points at which the ionically-conductive medium contacts the moving cathode structure and the moving metal-fuel tape during discharging and recharging modes of operation. In a first generalized embodiment of the present invention, the ionically-conductive medium is realized as an ionically-conductive belt, and the metal-fuel tape, ionically-conductive belt, and movable cathode structure are transported at substantially the same velocity at the locus of points which the ionically-conducing belt contacts the metal-fuel tape and the cathode structure during system operation. In a second generalized embodiment of the present invention, the ionically-conductive medium is realized as a solid-state film layer integrated with the metal-fuel tape. In a third generalized embodiment of the present invention, the ionically-conductive medium is realized as a solid-state film layer integrated with the movable cathode structure. By transporting the movable cathode structure, ionically contacting medium and metal-fuel tape within the system as described above, generation of frictional forces among such structures are minimized during system operation, and thus the damage to the cathode structure and metal-fuel tape is substantially reduced.

5 Claims, 10 Drawing Sheets

U.S. PATENT DOCUMENTS

| | | |
|---|---|---|
| 3,532,548 | 10/1970 | Stachurski . |
| 3,536,535 | 10/1970 | Lippincott . |
| 3,577,281 | 5/1971 | Pountney et al. . |
| 3,663,298 | 5/1972 | McCoy et al. . |
| 3,717,505 | 2/1973 | Unkle, Jr. et al. . |
| 3,822,149 | 7/1974 | Hale . |
| 3,928,072 | 12/1975 | Gerbler et al. . |
| 3,963,519 | 6/1976 | Louie . |
| 3,977,901 | 8/1976 | Buzzelli . |
| 4,052,541 | 10/1977 | Krusenstierna . |
| 4,152,489 | 5/1979 | Chottiner . |
| 4,172,924 | 10/1979 | Warszawski . |
| 4,246,324 | 1/1981 | de Nora et al. . |
| 4,331,742 | 5/1982 | Lovelace et al. . |
| 4,341,847 | 7/1982 | Sammells . |
| 4,551,399 | 11/1985 | Despic . |
| 4,560,626 | 12/1985 | Joy . |
| 4,626,482 | 12/1986 | Hamlen et al. . |
| 4,693,946 | 9/1987 | Niksa et al. . |
| 4,714,662 | 12/1987 | Bennett . |
| 4,828,939 | 5/1989 | Turley et al. . |
| 4,913,983 | 4/1990 | Cheiky . |
| 4,916,036 | 4/1990 | Cheiky . |
| 4,950,561 | 8/1990 | Niksa et al. . |
| 4,957,826 | 9/1990 | Cheiky . |
| 4,968,396 | 11/1990 | Harvey . |
| 5,250,370 * | 10/1993 | Faris ........................................ 429/68 |
| 5,260,144 | 11/1993 | O'Callaghan . |
| 5,306,579 | 4/1994 | Shepard, Jr. et al. . |
| 5,318,861 | 6/1994 | Harats et al. . |
| 5,328,777 | 7/1994 | Bentz et al. . |
| 5,328,778 | 7/1994 | Woodruff et al. . |
| 5,354,625 | 10/1994 | Bentz et al. . |
| 5,362,577 | 11/1994 | Pedicini . |
| 5,387,477 | 2/1995 | Cheiky . |
| 5,389,456 | 2/1995 | Singh et al. . |
| 5,405,713 | 4/1995 | Pecherer et al. . |
| 5,418,080 | 5/1995 | Korall et al. . |
| 5,439,758 | 8/1995 | Stone et al. . |
| 5,462,816 | 10/1995 | Okamura et al. . |
| 5,486,429 | 1/1996 | Thibault . |
| 5,512,384 * | 4/1996 | Celeste et al. ................... 429/127 X |
| 5,525,441 | 6/1996 | Reddy et al. . |
| 5,536,592 * | 7/1996 | Celeste et al. ................... 429/127 X |
| 5,554,452 | 9/1996 | Delmolino et al. . |
| 5,582,931 | 12/1996 | Kawahami . |
| 5,599,637 | 2/1997 | Pecherer, et al. . |
| 5,691,074 | 11/1997 | Pedicini . |
| 5,711,648 | 1/1998 | Hammerslag . |
| 5,721,064 | 2/1998 | Pedicini et al. . |
| 5,756,228 | 5/1998 | Roseanou . |

OTHER PUBLICATIONS

New Age EVs by Herb Schuldner, Popular Mechanics, 1991, p. 27–29 (Sep.).

Marketing Study for AER Energy Resources, Inc. by Authors not indicated, AER Energy Resources, Inc., 1991, p. 6–28 (Month unknown).

Electric Car Showdown in Phoenix by Rick Cook, Popular Science, 1991, p. 64–65,82 (Jul.).

Batteries for Cordless Appliances by Ralph J. Brodd, Ch. 3 of Batteries for Cordless Appliances, 1987, p. 49–59 (Month unknown).

PCT/US98/21257 105–044 PCT000 Search Report, Apr. 1999.

PCT/US98/21260 Search Report, Feb. 1999.

PCT/US98/21256 International Search Report, Feb. 1999.

* cited by examiner

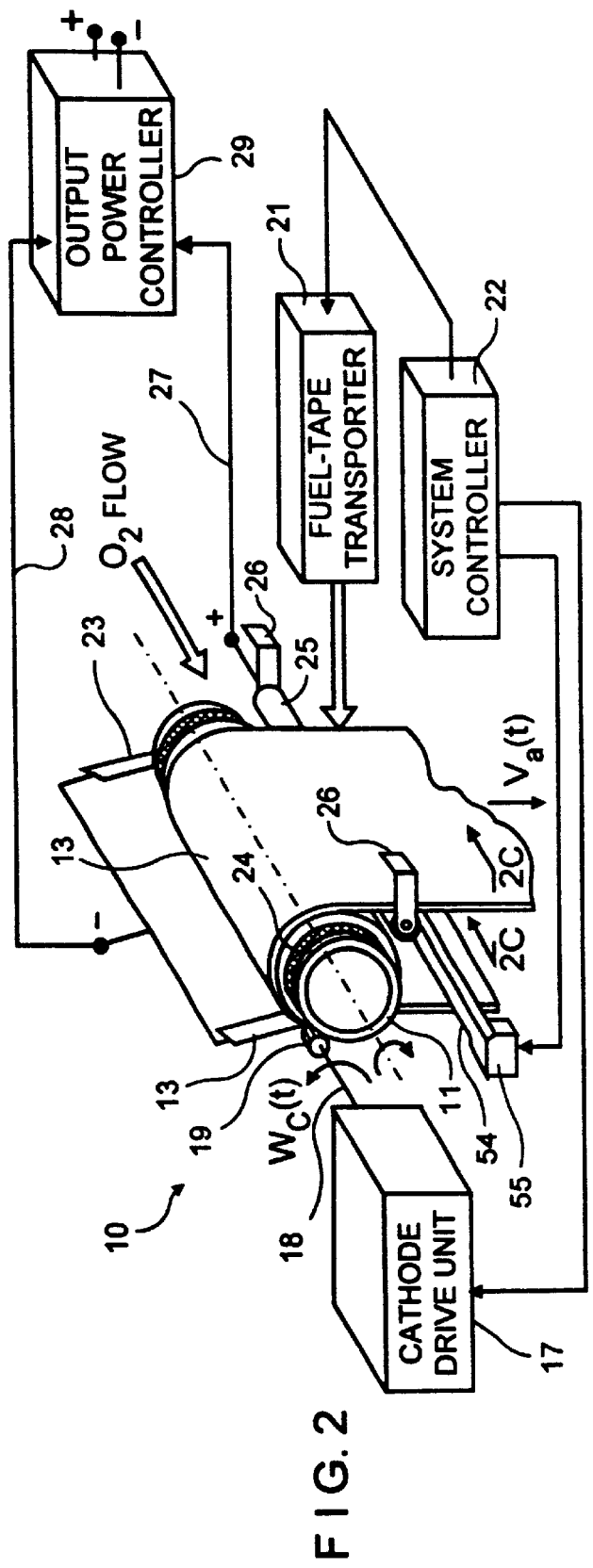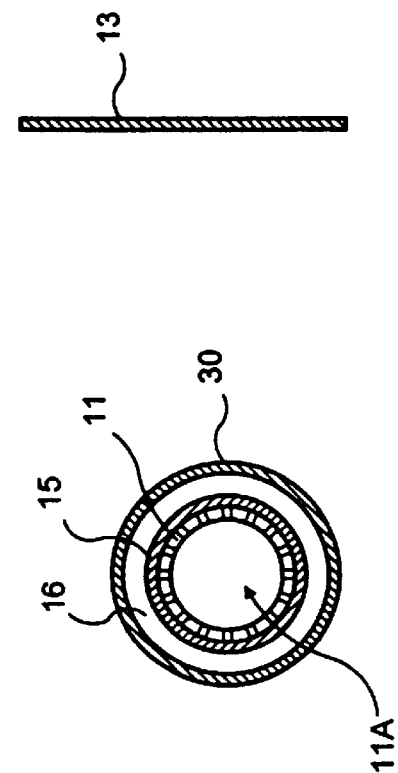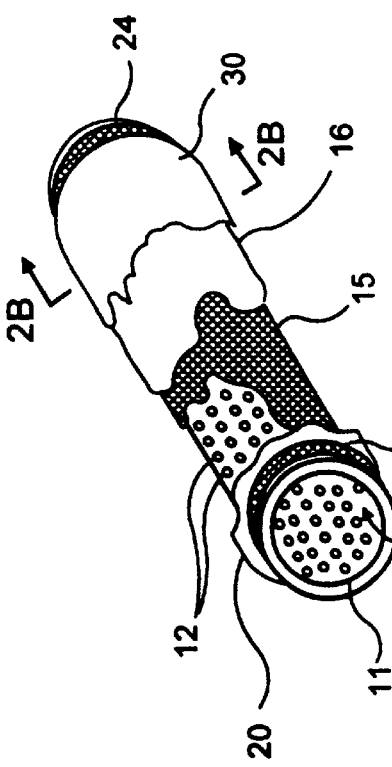

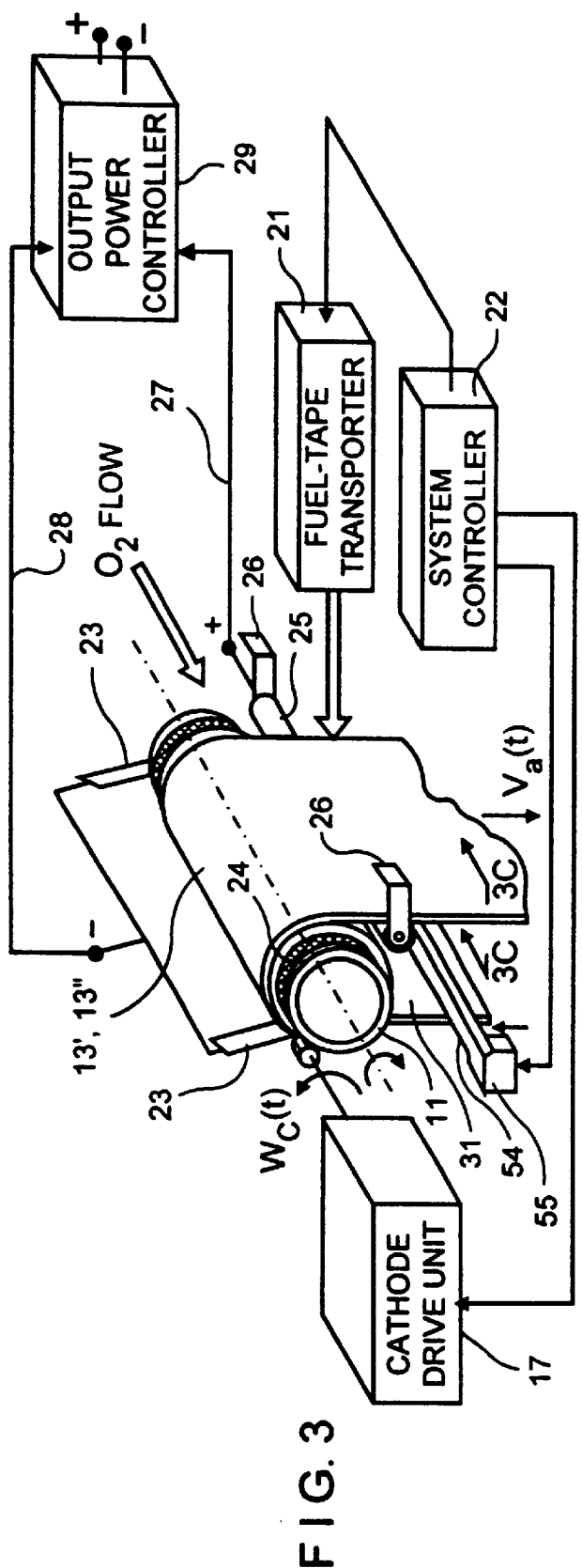
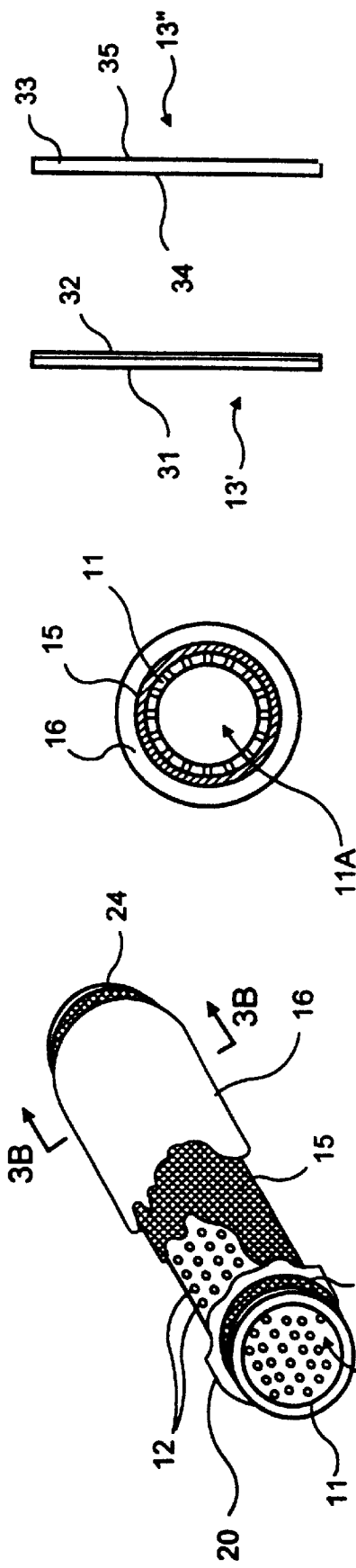

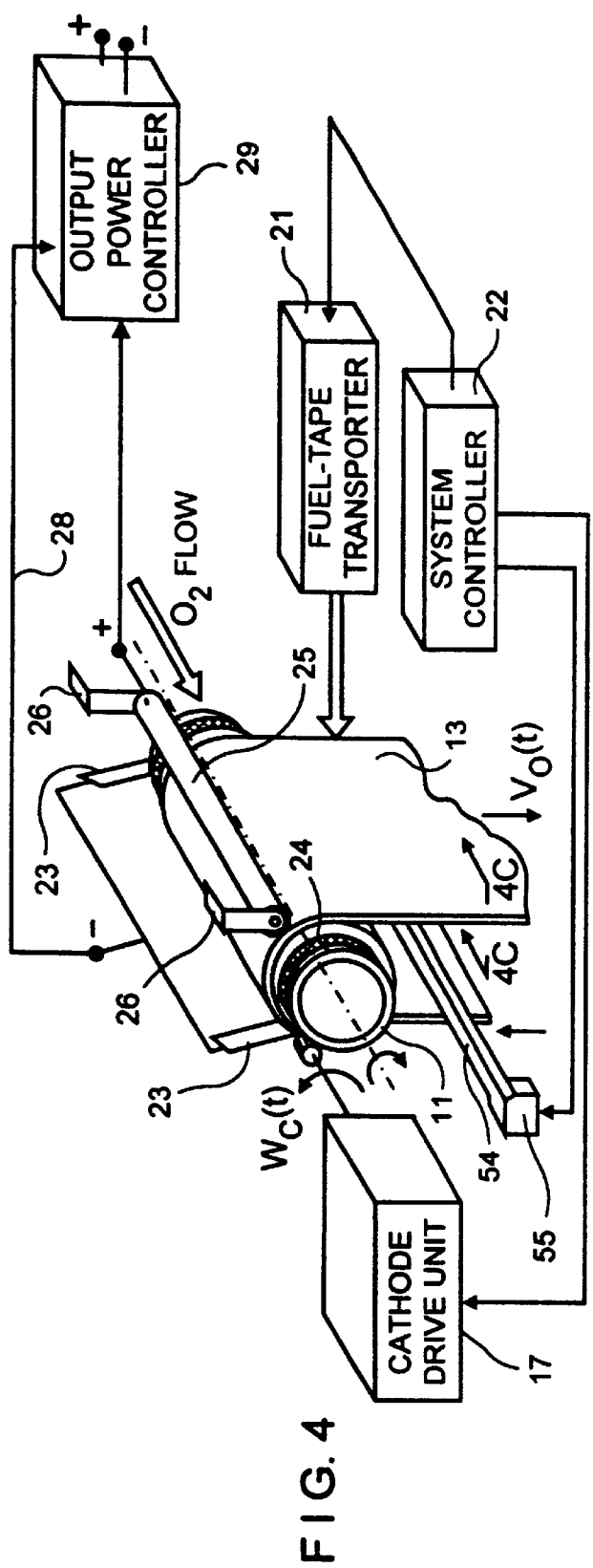
FIG. 4
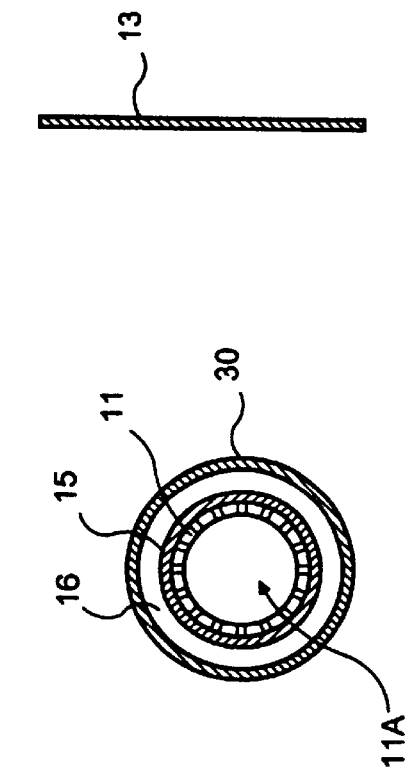
FIG. 4C
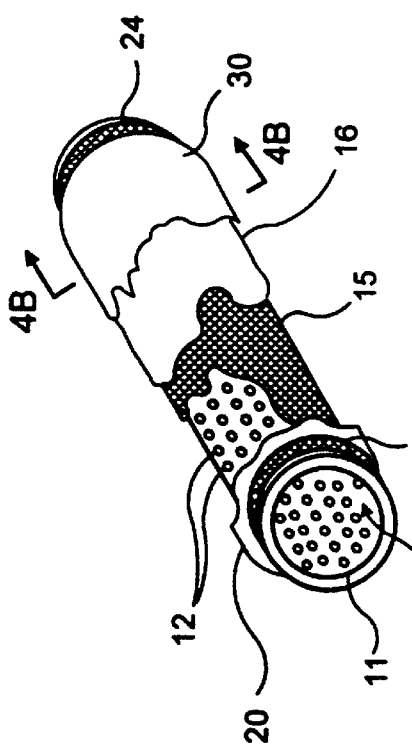
FIG. 4B
FIG. 4A

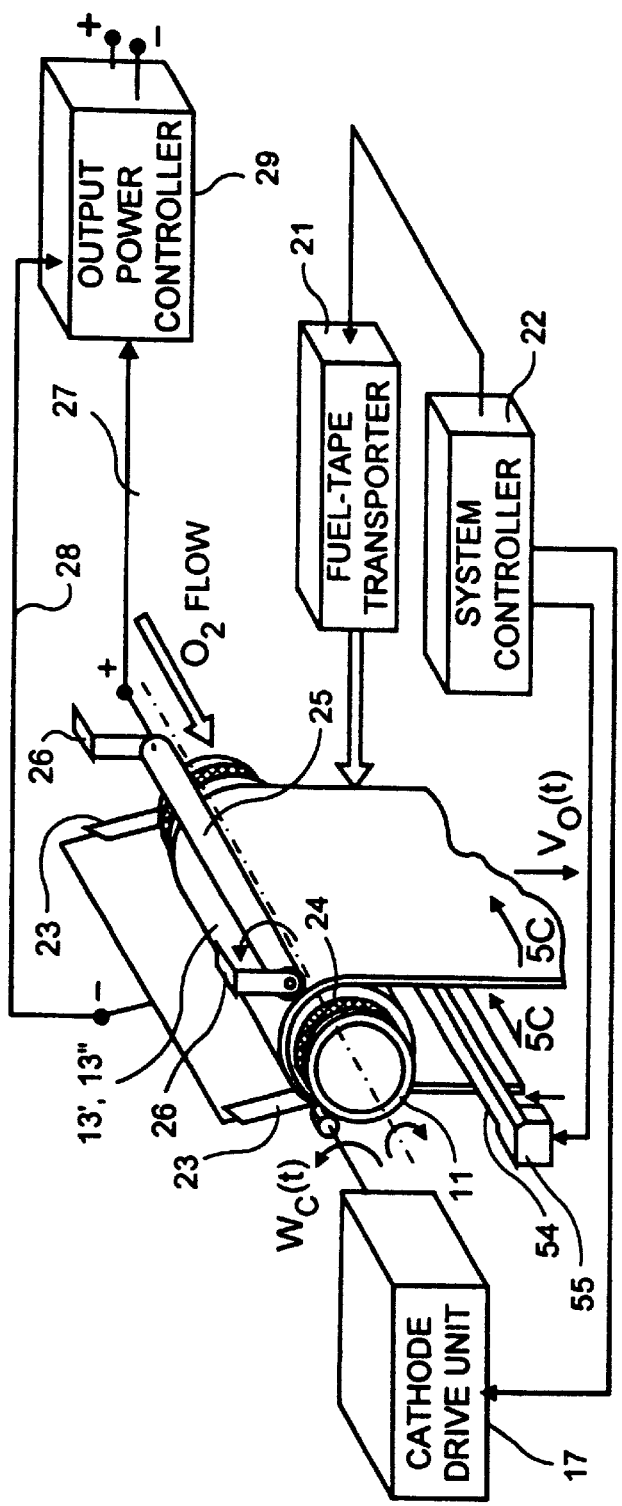
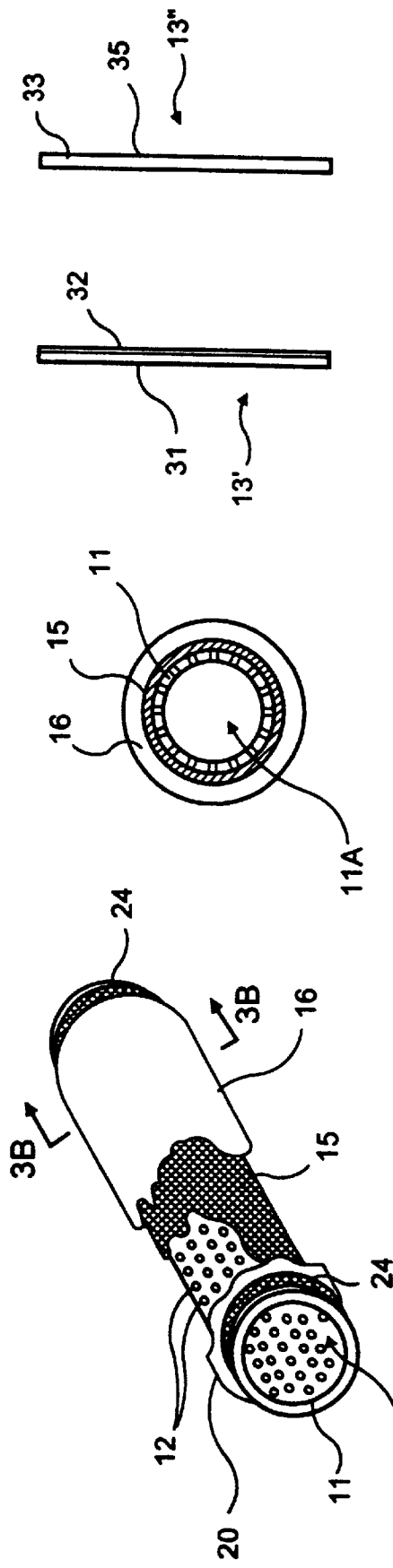
FIG. 5
FIG. 5A
FIG. 5B
FIG. 5C1
FIG. 5C2

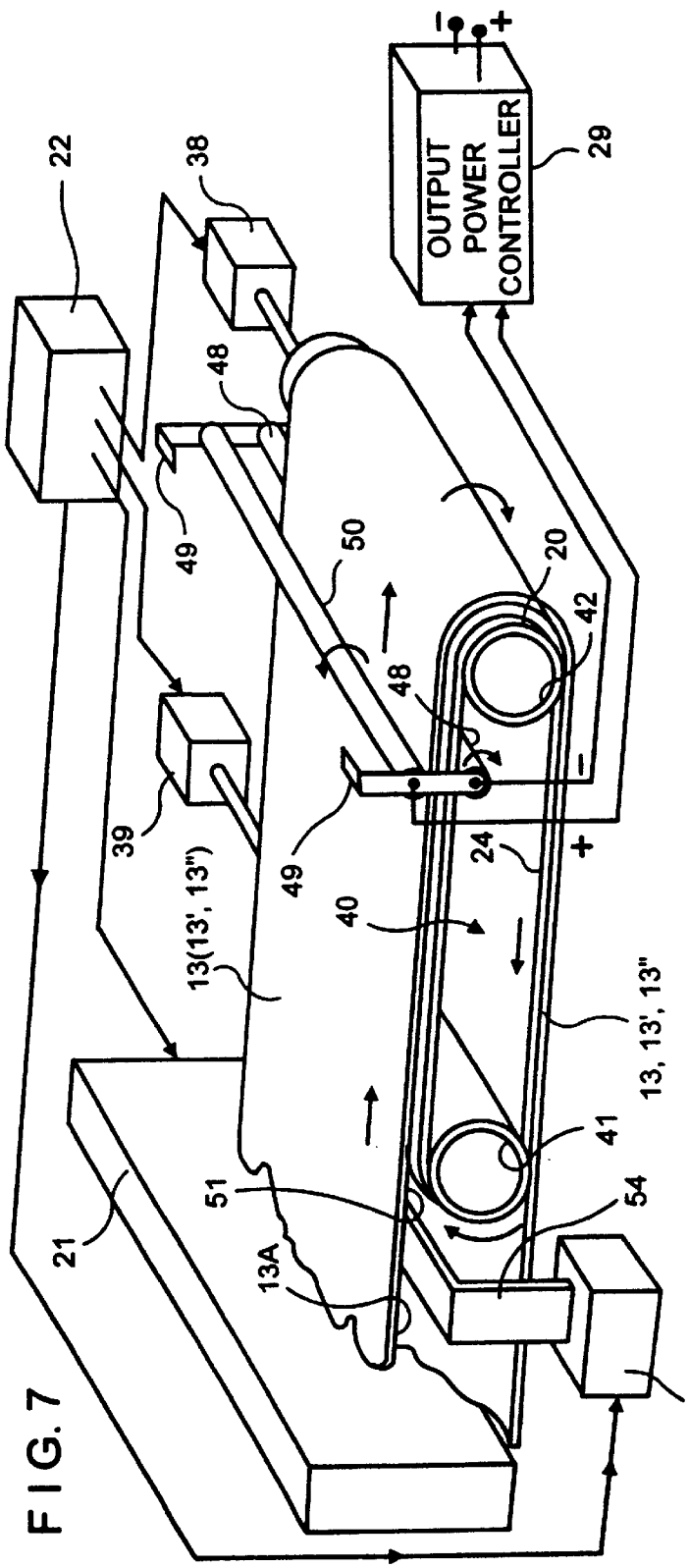
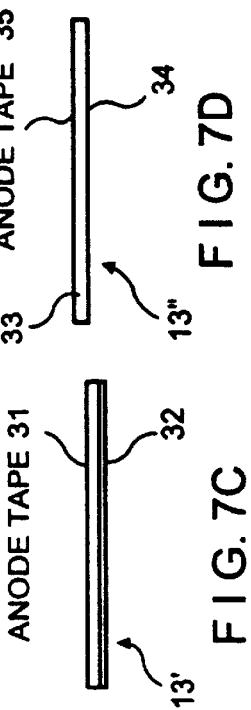
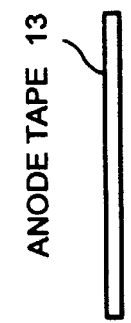
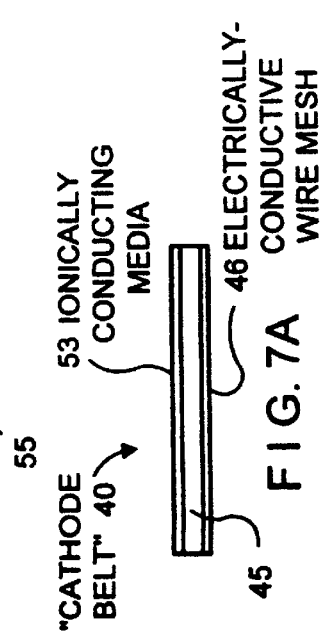

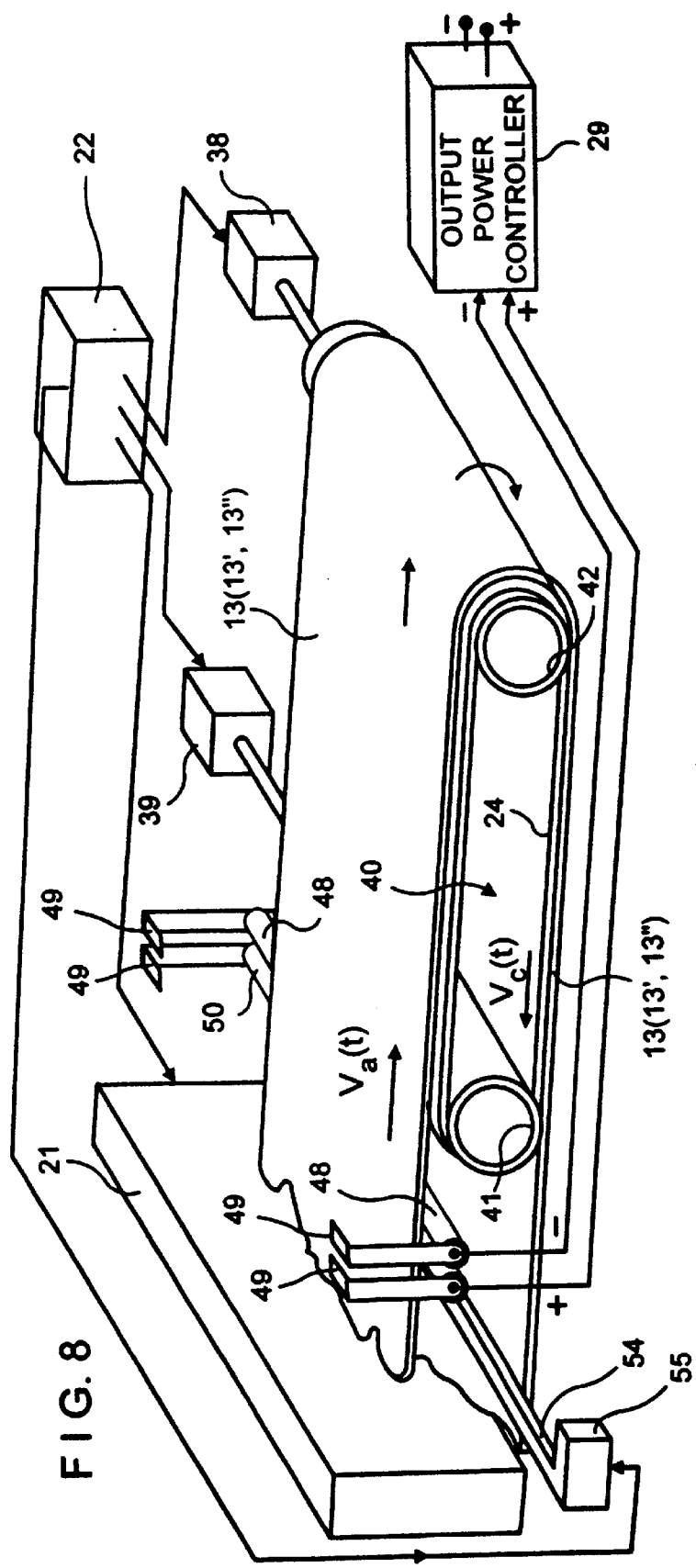

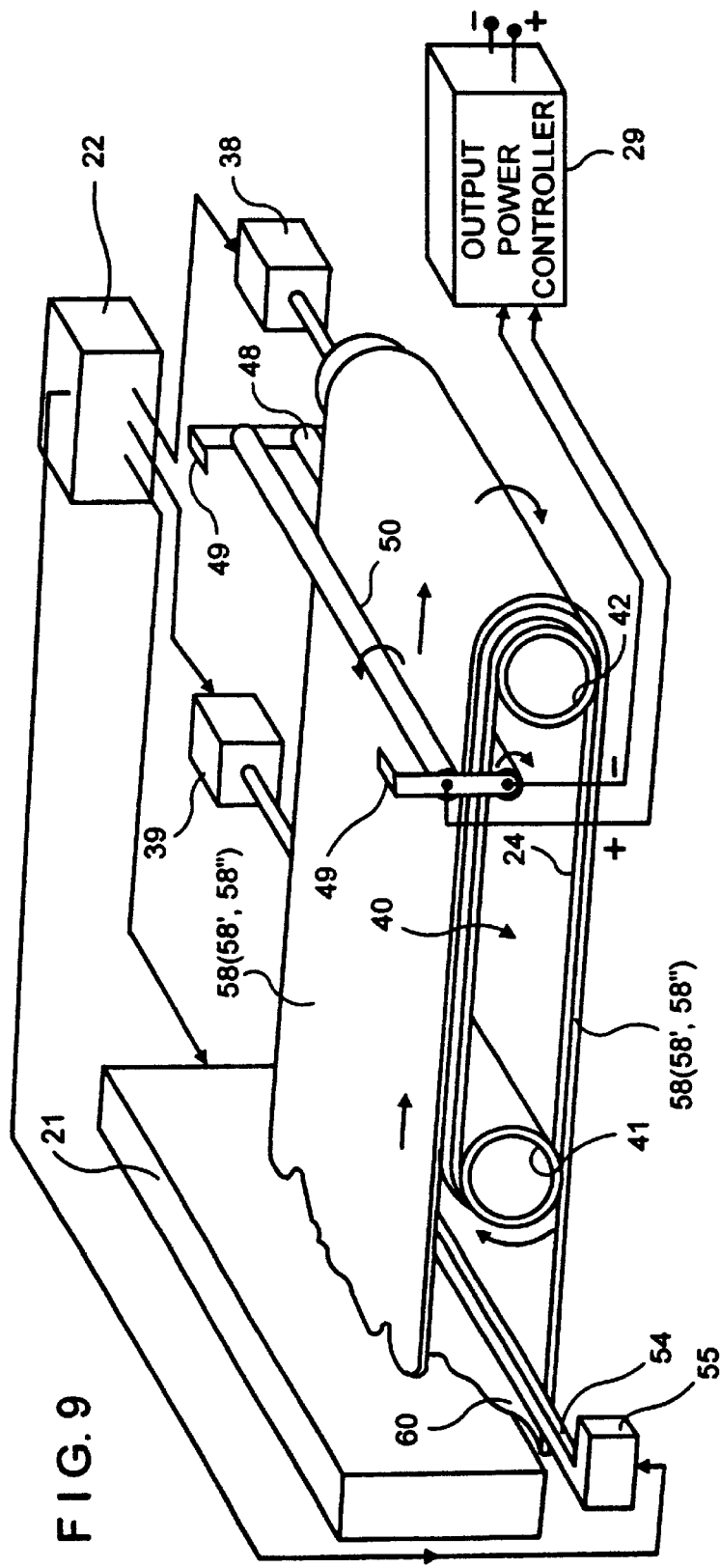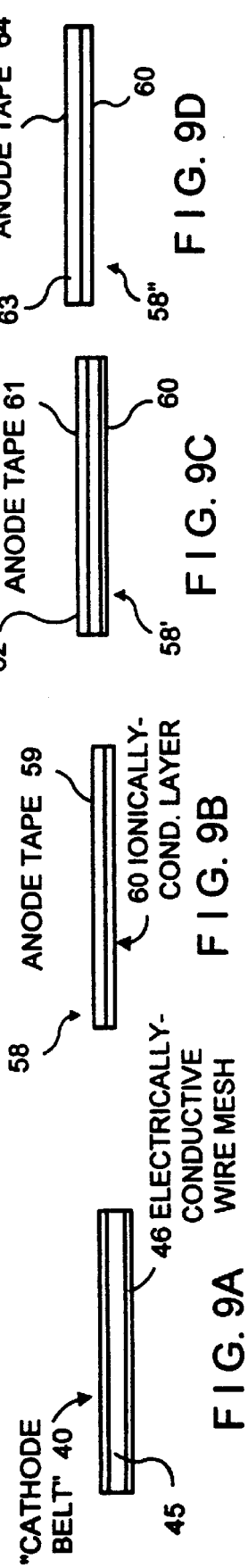

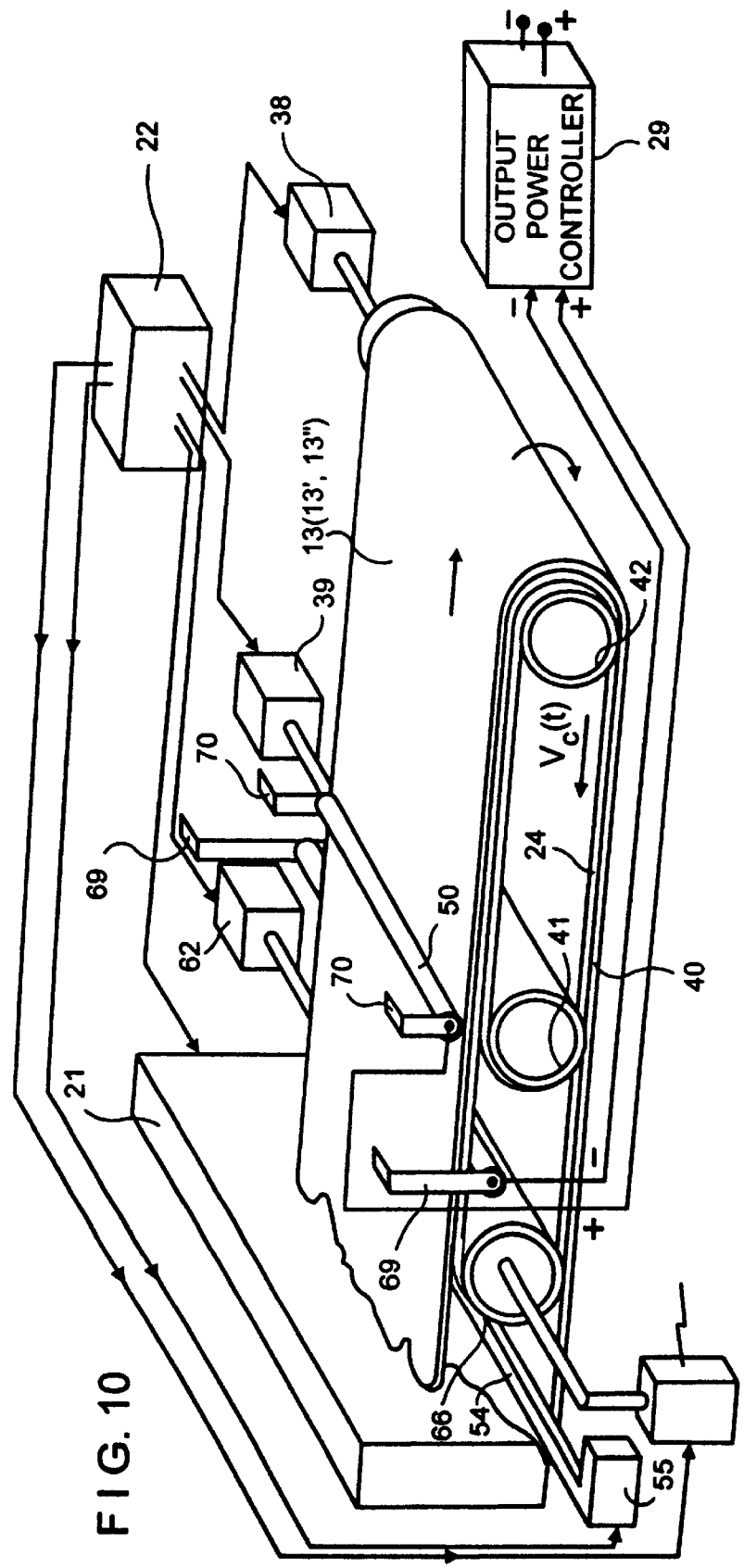

IONICALLY-CONDUCTIVE BELT STRUCTURE FOR USE IN A METAL-AIR FUEL CELL BATTERY SYSTEM AND METHOD OF FABRICATING THE SAME

RELATED CASES

This is a Continuation-in-Part of: copending application Ser. No. 09/074,337 entitled "Metal-Air Fuel-Cell Battery Systems" filed May 7, 1998; and copending application Ser. No. 08/944,507 entitled "High-Power Density Metal-Air Fuel Cell Battery System" by Sadeg Paris, et al. filed Oct. 6, 1997, said application being assigned to Reveo, Inc. and incorporated herein by reference in its entirety.

BACKGROUND OF INVENTION

1. Field of Invention

The present invention relates to metal-air fuel cell battery systems designed to produce electrical power from metal-fuel tape transported over the cathode structures of the system, and more particularly to such systems employing movable cathode structures having low friction characteristics.

2. Brief Description Of The Prior Art

In copending U.S. application Ser. No. 08/944,507 entitled "High-Power Density Metal-Air Fuel Cell Battery System, Applicants disclose several types of novel metal-air fuel cell battery (FCB) systems. During power generation, metal-fuel tape is transported over a stationary cathode structure in the presence of an ionically-conductive medium, such as an electrolyte-impregnated gel (i.e. electrolyte-impregnated film). In accordance with well known principles of electro-chemistry, the transported metal-fuel tape is oxidized as electrical power is produced from the system.

FCB power generation systems of the type disclosed in U.S. application Ser. No. 08/944,507 have numerous advantages over prior art electro-chemical power generation devices including, for example, the generation of electrical power over a range of output voltage levels selectable to particular electrical load conditions. Also, the oxidized metal-fuel tape can be reconditioned (i.e. recharged) during battery charging cycles carried out during electrical power generation, as well as separately therefrom.

In copending application Ser. No. 09/074,337 entitled "Metal-Air Fuel-Cell Battery Systems" filed May 7, 1998, Applicants disclose several novel systems and methods for reconditioning oxidized metal-fuel tape used in FCB systems. In theory, such technological improvements enable metal-fuel tape to be quickly recharged in an energy efficient manner for reuse in electrical power generation cycles. Such advances offer great promise in many fields of endeavor requiring electrical power.

The greatest limitation, however, with prior art metal-air FCB systems is that, as the metal-fuel tape is being transported over the stationary cathode structures within such systems, frictional (e.g. shear) forces are generated, causing a number of problems to arise.

One problem is that such frictional forces cause an increase in the amount of electrical power required to transport the metal-fuel tape through the system.

Another problem is that such frictional forces cause metal-oxide particles to be shed from metal-fuel tape during transport and to become embedded within the porous structure of the cathode, thereby preventing ionic transport between the cathode and ionically-conductive medium (i.e. referred to as "blinding"), and increasing the likelihood of damage (or destruction) to the surface of the cathode structure and metal-fuel tape.

Overall, such problems tend to reduce the operational efficiency of prior art metal-air FCB systems, as well as the life of the cathode structures and metal-fuel tape employed therein.

Thus, there is a great need in the art for an improved metal-air fuel cell battery system which avoids the shortcomings and drawbacks of prior art systems and methodologies.

OBJECTS AND SUMMARY OF THE INVENTION

Accordingly, it is a primary object of the present invention to provide an improved metal-air fuel cell battery (FCB) system which avoids the shortcomings and drawbacks of prior art systems and methodologies.

Another object of the present invention is to provide such a system, wherein both the metal-fuel tape, ionically-conductive medium and cathode structures are moved relative to each other during system operation in order to reduce frictional (e.g. shear) forces generated by relative movement among the cathode structure(s), metal-fuel tape and ionically-conductive medium during system operation.

Another object of the present invention is to provide such a system, wherein this reduction in frictional forces results in: a reduction in the amount of electrical power required to drive the cathode structure(s), the metal-fuel tape and ionically-conductive medium during system-operation; a reduction in the shedding of metal-oxide particles from metal-fuel tape and the embedding of such particles within the porous structure of the cathode; and a decrease the likelihood of damage to the cathode structures and metal-fuel tape employed in the system.

Another object of the present invention is to provide such metal-air fuel cell battery system, wherein a transport mechanism is used to transport the cathode structures, ionically-conductive medium and metal-fuel tape at substantially the same velocity at the locus of points at which the ionically-conductive medium contacts both the metal-fuel tape and the cathode structures during system operation in order to minimize the generation of frictional forces between the movable cathode structures, metal-fuel tape and ionically-conductive medium.

Another object of the present invention is to provide such a system, wherein velocity control of the metal-fuel tape, cathode structures and ionically-conducting medium can be realized in a variety of different ways.

Another object of the present invention is to provide such a system, wherein the cathode structure is realized as a rotating cathode cylinder having fine perforations formed in the surface thereof and a hollow central core which enables the transport of oxygen to the interface between the ionically-conductive medium and metal-fuel tape transported thereover.

Another object of the present invention is to provide such a system, wherein the cylindrical cathode comprises a plastic hollow cylinder about which is attached is a cathode element made from nickel mesh fabric, for current collection, embedded within carbon, catalytic and binder material.

Another object of the present invention is to provide such a system, wherein the cylindrical cathode is rotated at a controlled angular velocity and the metal-fuel tape is transported over the surface of the rotating cathode so that both the metal-fuel tape and the cathode structure move at substantially the same velocity at the locus of points at which the ionically-conducing medium contacts both the metal-fuel tape and the cathode structure.

Another object of the present invention is to provide such a system, wherein the ionically-conductive medium is realized in the form of an ionically-conductive belt, transported (i.e. running) between two or more transport cylinders.

Another object of the present invention is to provide such a system, wherein the ionically-conductive belt is fabricated from an open-cell plastic material impregnated with an ionically-conductive material which enables ionic transport between the cathode and anode structures of the system.

Another object of the present invention is to provide such a system, wherein velocity control can be achieved in a variety of ways, for example: by driving the cylindrical cathode structure with a belt that is also used to transport the metal-fuel tape (i.e. between supply and take-up reels or hubs within a cassette type-device); or by driving the cylindrical cathode structure and supply and take-up hubs of a fuel cassette device using a set of speed controlled motors, or spring-driven motors.

Another object of the present invention is to provide such a system, wherein the ionically-conductive medium is realized as a solid-state (e.g. gel-like) film applied on the outer surface of the cylindrical cathode structure, and the metal-fuel tape is realized in the form of thin zinc tape, zinc power mixed with an binder and carried on a polyester substrate, or zinc powder impregnated within the substrate of the tape itself.

Another object of the present invention is to provide metal-air fuel cell battery system, wherein the rotatable cathode structure is realized as a cathode belt structure having ultrafine perforations in the surface thereof and a hollow central core for enabling oxygen transport to the interface between the ionically-conductive medium and the metal-fuel tape transported thereover.

Another object of the present invention is to provide such a system, wherein the cathode belt structure comprises an open-cell type plastic substrate, within which nickel mesh fabric is embedded with carbon and catalytic material.

Another object of the present invention is to provide such a system, wherein during system operation, the cathode belt structure is transported at a controlled velocity between two or more transport cylinders, while metal-fuel tape is transported over the surface of the cathode belt structure at substantially the same velocity at the locus of points at which the ionically-conducing medium contacts both the metal-fuel tape and the cathode structure.

Another object of the present invention is to provide such a system, wherein the ionically-conductive medium of the system is realized in the form of an ionically-conductive belt structure transported between the metal-fuel tape and the cathode belt structure at substantially the same velocity as the cathode belt structure and metal-fuel tape at the locus of points at which the ionically-conducing medium contacts both the metal-fuel tape and the cathode structure.

Another object of the present invention is to provide such a system, wherein the ionically-conductive medium of the system is realized in the form of a thin-film integrated with the outer surface of the cathode belt structure so as to establish contact with the anodic metal-fuel-tape transported thereover.

Another object of the present invention is to provide such a system, wherein the metal-fuel tape is realized in the form of thin zinc tape, zinc power mixed with an binder and carried on a polyester or like substrate, or zinc powder impregnated within the substrate itself.

Another object of the present invention is to provide a metal-air FCB system, wherein the surface tension between the metal-fuel tape and the ionically-conductive medium is sufficiently high (due to wetting of the metal-fuel tape, the ionically-conductive medium and the movable cathode structures) in order to create hydrostatic drag (i.e. hydrostatic attraction) between the metal-fuel tape and the ionically-conductive belt as well as between the cathode structure (e.g. cylinder or belt) and the ionically-conductive medium (e.g. belt or layer), thereby enabling coordinated movement among the metal-fuel tape, cathode structure (e.g. cylinder or belt) and ionically-conductive medium (e.g. belt or layer), with minimal slippage.

Another object of the present invention is to provide a FCB system employing hydrostatic drag between the metal-fuel tape and the ionically conductive medium and between the moving cathode structures and the ionically conductive medium so that all three of these movable system components can be transported (or moved) within the system by moving one or more of such system components (e.g. using spring-driven motor) thereby simplifying and reducing the cost of the system.

Another object of the present invention is to provide a system, wherein the metal-fuel tape, cathode structures and ionically-conductive medium are moved relative to each other so that frictional forces generated among the metal-fuel tape, cathode structures and ionically-conductive medium are substantially reduced, thereby reducing the amount of electrical power required to drive the cathode, metal-fuel tape and ionically-conductive medium and transport mechanisms, and decreasing the likelihood of damage to the cathode structure and metal-fuel tape, and permit reuse thereof over a large number of cycles without replacement.

These and other objects of the present invention will become apparent hereinafter and in the Claims To Invention.

BRIEF DESCRIPTION OF THE DRAWINGS

For a more complete understanding of the Objects of the Present Invention, the following detailed Description of the Illustrative Embodiments Of the Present Invention should be read in conjunction with the accompanying Drawings, wherein:

FIG. 2 is a first illustrative embodiment of the FCB system, wherein metal-fuel tape is passed over a rotating cathode cylinder having an ionically-conductive coating (e.g. gel-like or solid-state film) applied thereover, and wherein the anode-contacting structure of the system engages the inner surface of the metal-fuel tape;

FIG. 2A is a partially broken away perspective view of the cylindrical cathode structure of the present invention shown in FIG. 2, in which an ionically-conductive film layer is applied over the outer surface thereof;

FIG. 2B is a cross-sectional view of the cylindrical cathode structure shown in FIG. 2, taken along the line 2B—2B of FIG. 2A;

FIG. 2C is cross-sectional view of a section of the metal-fuel tape shown used in the system of FIG. 2C;

FIG. 3 is a second illustrative embodiment of the FCB system, wherein metal-fuel tape is passed over a second embodiment of the cylindrical cathode structure hereof which is driven an angular velocity equalized to the velocity of the metal-fuel tape, and wherein the anode-contacting structure engages the inner surface of the metal-fuel tape and the metal-fuel tape has an ionically-conductive coating applied thereon;

FIG. 3A is a partially broken away perspective view of the cylindrical cathode structure of the present invention shown in FIG. 3, in which the cathode structure thereof is exposed to the ambient environment;

FIG. 3B is a cross-sectional view of the cylindrical cathode structure shown in FIG. 3, taken along the line 3B—3B of FIG. 3A;

FIG. 3C1 is cross-sectional view of a section of a first type of metal-fuel tape that can be used in the system of FIG. 3C, showing an ionically-conductive film layer applied to the surface of a thin layer of metal fuel;

FIG. 3C2 is cross-sectional view of a section of a second type of metal-fuel tape that can be used in the system of FIG. 3C, showing a substrate material embodying an ionically-conductive medium and metal-fuel particles;

FIG. 4 is a third illustrative embodiment of the FCB system, in which metal-fuel tape is passed over the cylindrical cathode structure hereof driven an angular velocity equalized to the velocity of the metal-fuel tape and having an ionically-conductive coating applied thereover, and wherein the anode-contacting structure engages the outer surface of the metal-fuel tape;

FIG. 4A is a partially broken away perspective view of the cylindrical cathode structure of the present invention shown in FIG. 4, in which the cathode structure thereof has an ionically-conductive coating applied thereover;

FIG. 4B is a cross-sectional view of the cylindrical cathode structure shown in FIG. 3, taken along the line 4B—4B of FIG. 4A;

FIG. 4C is cross-sectional view of a section of metal-fuel tape that can be used in the system of FIG. 4C;

FIG. 5 is a fourth illustrative embodiment of the FCB system, in which metal-fuel tape is passed over a fourth embodiment of the cylindrical cathode structure hereof driven at an angular velocity equalized to the velocity of the metal-fuel tape, and wherein the anode contacting structure engages the outer surface of the metal-fuel tape and the metal-fuel tape has an ionically-conductive coating applied thereon;

FIG. 5A is a partially broken away perspective view of the cylindrical cathode structure of the present invention shown in FIG. 5, in which the cathode structure thereof is exposed to the ambient environment;

FIG. 5B is a cross-sectional view of the cylindrical cathode structure shown in FIG. 5, taken along the line 5B—5B of FIG. 5A;

FIG. 5C1 is cross-sectional view of a section of a first type of metal-fuel tape that can be used in the system of FIG. 5C, showing an ionically-conductive film layer applied to the surface of a thin layer of metal fuel;

FIG. 5C2 is cross-sectional view of a section of second type of metal-fuel tape that can be used in the system of FIG. 5C, showing an ionically-conductive medium embodied within a substrate material embodying metal-fuel particles;

FIG. 7 is a sixth illustrative embodiment of the FCB system, wherein metal-fuel tape is transported over the ionically-conductive solid-state film layer on a cathode belt structure, at substantially the same velocity as the cathode belt structure at the locus of points at which the ionically-conductive film layer contacts both the cathode belt structure and the metal-fuel tape, and wherein the anode-contacting structure engages the outer surface of the metal-fuel tape between the cylindrical support structure and the cathode-contacting structure is disposed opposite the anode support structure and engages the inner surface of the cathode belt structure;

FIG. 7A is a cross-sectional view of the cathode belt structure shown in FIG. 7;

FIG. 7B is cross-sectional view of a section of a first type of metal-fuel tape that can be used in the system of FIG. 7, realized in the form of thin layer of metal fuel;

FIG. 7C is cross-sectional view of a section of a second type of metal-fuel tape that can be used in the system of FIG. 7, realized by depositing metallic powder and binder on a substrate;

FIG. 7D is cross-sectional view of a section of a third type of metal-fuel tape that can be used in the system of FIG. 7, realized by impregnating metallic powder within a substrate material;

FIG. 8 is a seventh illustrative embodiment of the FCB system, wherein metal-fuel tape is transported over the ionically-conductive solid-state film layer on a cathode belt structure, at substantially the same velocity as the cathode belt structure at the locus of points at which the ionically-conductive film layer contacts both the cathode belt structure and the metal-fuel tap, and wherein the cathode-contacting structure engages the outer surface of the cathode belt structure passing over a cylindrical cathode roller and the anode-contacting structure is disposed adjacent the cylindrical cathode roller and engages the inner surface of the cathode belt structure;

FIG. 8A is a cross-sectional view of the cathode belt structure shown in FIG. 8;

FIG. 8B is cross-sectional view of a section of a first type of metal-fuel tape that can be used in the system of FIG. 8, realized in the form of thin layer of metal fuel;

FIG. 8C is cross-sectional view of a section of a second type of metal-fuel tape that can be used in the system of FIG. 8, realized by depositing metallic powder and binder on a substrate;

FIG. 8D is cross-sectional view of a section of a third type of metal-fuel tape that can be used in the system of FIG. 8, realized by impregnating metallic powder within a substrate material;

FIG. 9 is eight illustrative embodiment of the FCB system, wherein metal-fuel tape having a solid-state ionically-conductive film layer applied thereto is transported over a cathode belt structure at substantially the same velocity as the metal-fuel tape at the locus of points at which the ionically-conductive film layer contacts both the metal-fuel tape and the cathode belt structure, and wherein the anode-contacting structure engages the outer surface of the metal-fuel tape between the cathode belt transport cylinders and the cathode-contacting structure is disposed opposite the anode-contacting structure between the cathode belt transport cylinders and engages the inner surface of the cathode belt structure;

FIG. 9A is a cross-sectional view of the cathode belt structure shown in FIG. 9;

FIG. 9B is a cross-sectional view of a section of a first type of metal-fuel tape that can be used in the system of FIG. 9, realized in the form of thin layer of metal fuel carrying an ionically-conductive film layer;

FIG. 9C is a cross-sectional view of a section of a second type of metal-fuel tape that can be used in the system of FIG. 9, realized by metallic powder and binder on a substrate carrying an ionically-conductive layer;

FIG. 9D is a cross-sectional view of a section of a third type of metal-fuel tape that can be used in the system of FIG. 9, realized by impregnating metallic powder within a substrate material carrying an ionically conductive layer;

FIG. 10 is a ninth illustrative embodiment of the FCB system, wherein metal-fuel tape is transported over an ionically-conductive belt which is transported over a cathode belt structure at substantially the same velocity at the locus of points at which the ionically-conductive belt contacts both the metal-fuel tape and the cathode belt structure, and wherein the cathode-contacting structure engages the outer surface of the cathode belt structure passing over a cathode belt transport cylinder and the anode-contacting structure is disposed adjacent the cathode belt transport cylinder and engages the inner surface of the cathode belt structure;

FIG. 10A is a cross-sectional view of a first type of cathode belt structure that can be used in the system shown in FIG. 10;

FIG. 10B is a cross-sectional view of a second type of cathode belt structure that can be used in the system shown in FIG. 10;

FIG. 10C is cross-sectional view of a section of a first type of metal-fuel tape that can be used in the system of FIG. 10, realized in the form of thin layer of metal fuel;

FIG. 10D is cross-sectional view of a section of a second type of metal-fuel tape that can be used in the system of FIG. 10, realized by depositing metallic powder and binder on a substrate; and FIG. 10E is cross-sectional view of a section of a third type of metal-fuel tape that can be used in the system of FIG. 8, realized by impregnating metallic powder within a substrate material.

DETAILED DESCRIPTION OF THE ILLUSTRATIVE EMBODIMENTS OF THE PRESENT INVENTION

Figure 1A:
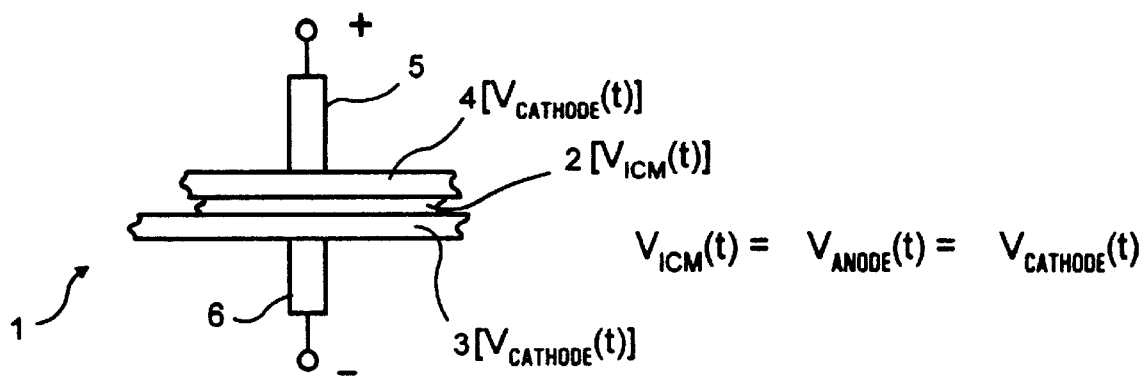
FIG. 1A is a schematic representation of a first generalized embodiment of the metal-air fuel-cell battery (FCB) system of the present invention, wherein the ionically-conductive medium is a viscous electrolyte that is free to move at the same velocity as the metal-fuel tape and cathode structure(s) of the system, at the locus of points at which the ionically-conducing medium contacts the metal-fuel tape and the cathode structure during system operation.
Figure 1B:
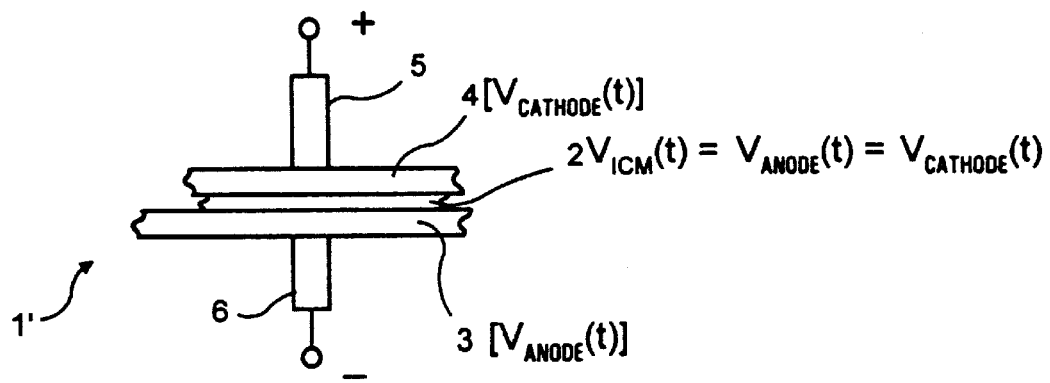
FIG. 1B is a schematic representation of a second generalized embodiment of the (FCB) system of the present invention, wherein the ionically-conductive medium is integrated with the metal-fuel tape and transported at substantially the same velocity as the cathode structure at the locus of points at which the ionically-conducing medium contacts the metal-fuel tape and the cathode structure during system operation.
Figure 1C:
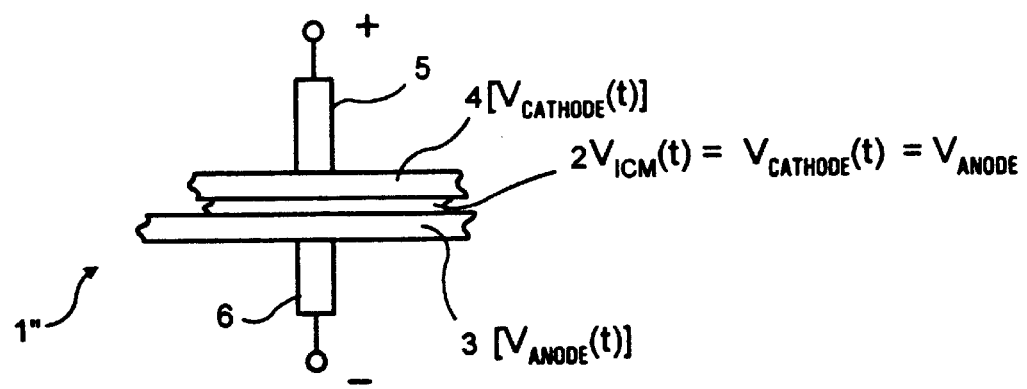
FIG. 1C is a schematic representation of a third generalized embodiment of the system of the present invention, wherein the ionically-conductive medium is integrated with the cathode structure, and transported at substantially the same velocity as the metal-fuel tape at the locus of points at which the ionically-conducing medium contacts the metal-fuel tape and the cathode structure during system operation.

The present invention teaches transporting the metal-fuel tape, cathode structure(s) and ionically-conductive medium in a metal-air FCB system at substantially the same velocity at the locus of points at which the ionically-conductive medium contacts the cathode structures and the metal-fuel tape. This condition of operation substantially reduces the generation of frictional (e.g. shear) forces among the metal-fuel tape, cathode structures and ionically-conductive medium. In turn, this reduction in frictional (e.g shear) forces among such system components results in a reduction in: the amount of electrical power required to transport the cathode structures, metal-fuel tape and ionically-conductive medium during system operation; the shedding of metal-oxide particles from metal-fuel tape and the embedding of such particles within the porous structure of the cathode; and the likelihood of damaging of the cathode structures and metal-fuel tape used in the FCB system. In FIGS. 1A through 1C, this principle of operation is schematically illustrated for three different FCB system designs.

A first generalized embodiment of the metal-air FCB system of the present invention is generally depicted by reference numeral 1 shown in FIG. 1A. In this generalized embodiment of the present invention, the ionically-conductive medium (ICM) 2 is realized as a fluid or fluid-like substance which is free to move relative to both the metal-fuel tape 3 and the cathode structure(s) 4 employed within the system, while the metal-fuel tape and cathode structure(s) are transported at substantially the same velocity at the locus of points which the ionically-conducing medium contacts the metal-fuel tape and the cathode structure during tape discharging and recharging cycles. As shown, a cathode-contacting elements 5 establishes electrical contact with cathode structures 4 during system operation while an anode-contacting element 6 establishes electrical contact with metal-fuel tape (i.e. anode) 3.

A second generalized embodiment of the metal-air FCB system of the present invention is generally depicted by reference numeral 1 and shown in FIG. 1B. In this generalized embodiment of the present invention, the ionically-conductive medium 2 is integrated with the surface of the metal-fuel tape 3 (e.g. in the form of a (gel-like or solid-state film layer applied thereto), while the metal-fuel tape 3, ionically-conductive medium 2 and cathode structure(s) 4 are transported at substantially the same velocity at the locus of points at which the ionically-conductive medium 2 contacts both the metal-fuel tape 3 and the cathode structure 4 during system operation.

A third generalized embodiment of the metal-air fuel-cell battery (FCB) system of the present invention is shown in FIG. 1C, and generally depicted by reference numeral 1. In this generalized embodiment of the present invention (e.g. in the form of a gel-like or solid-state film layer applied thereto), while the metal-fuel tape 3, ionically-conductive medium 2, and cathode structure(s) 4 are transported at substantially the same velocity at the locus of points at which the ionically-conducing medium contacts the metal-fuel tape and the cathode structure during system operation.

There are various ways to realize the ionically-conductive medium in each of these generalized embodiments of the FCB system. Also, there are various ways in which to achieve velocity control (i.e. velocity equalization) in each of these generalized system embodiments. Depending on how the cathode structure is realized, the illustrative embodiments of the present invention disclosed herein can be classified into one of two groups to simplify description of the corresponding FCB systems.

For example, in the first group of illustrative embodiments, shown in FIGS. 2 through 6D, the cathode structure is realized as a rotatable structure of cylindrical geometry having fine perforations in the surface thereof and a hollow central core enabling the transport of air (i.e. oxygen) to the interface between the metal-fuel tape and ionically-conductive medium. In the second group of illustrative embodiments, shown in FIGS. 7 through 10D, the cathode structure is realized as a belt structure having ultrafine perforations in the surface thereof to permit oxygen transport to the metal-fuel tape and the ionically-conductive medium. The FCB systems classified into these two groups will now be described in detail below.

First Illustrative Embodiment of the FCB System

In the first illustrative embodiment of the FCB system 10 shown in FIGS. 2 through 2C, the cathode structure 4 is realized as a plastic cylindrical structure 11 having a hollow center 11A with fine perforations 12 in the surface thereof to permit oxygen transport to the interface formed between the ionically-conductive medium and metal-fuel tape 13 transported thereover. As shown, a cathode element 14 is mounted over the outer surface of the plastic hollow cylinder 11. The cathode element 14 is made from nickel mesh fabric 15 embedded within carbon and catalytic material 16. Preferably, the metal-fuel tape 13 is transported between a pair of supply and take-up reels as taught in Applicant's copending application Ser. No. 09/074,337. Also, the metal-fuel tape can be fabricated using any of the techniques taught in application Ser. No. 09/074,337.

In the event that the cathode cylinder 11 is employed within a Metal-Fuel Tape Discharging Subsystem, then each of the subsystems contained within the Metal-Fuel Tape Discharging Subsystem disclosed in copending application Ser. No. 09/074,337 can be incorporated into the system schematically depicted in FIG. 2. Thus, as taught in Applicant's copending application Ser. Nos. 09/074,337 and 08/944,507, the interior portion of the cathode cylindrical 11 shown in FIG. 2 can be equipped with an oxygen-injection chamber (connected to an air pump or oxygen source), one or more $pO_2$ sensors, one or more temperature sensors, discharging head cooling equipment, and the like, so that system controller 22 can control the $pO_2$ level within the cathode element 14, as well as maintain the temperature of the discharging head during discharging operations.

Similarly, in the event that the cathode cylinder 11 is employed within a Metal-Fuel Tape Recharging Subsystem, then each of the subsystems contained within the Metal-Fuel Tape Recharging Subsystem disclosed in copending application Ser. No. 09/074,337 can be incorporated into the system schematically depicted in FIG. 2. Thus, as taught in Applicant's copending application Ser. Nos. 09/074,337, the interior portion of the cathode cylindrical 11 shown in FIG. 2 can be equipped with an oxygen-evacuation chamber (connected to a vacuum pump or like device), one or more $pO_2$ sensors, one or more temperature sensors, recharging head cooling equipment, and the like, so that system controller 22 can control the $pO_2$ level within the cathode element 14, as well as maintain the temperature of the recharging head during recharging operations.

As shown in FIG. 2, the cathode cylinder 11 is rotated about its axis of rotation at an angular velocity controlled by a cathode drive unit 17. As shown, the cathode drive unit 17 has a drive shaft 18 with a gear 19 that engages teeth formed on the edge of cylindrical structure 11. The metal-fuel tape 13 is transported over the surface of the cylindrical cathode element 14 by a fuel-tape transporter 21 operable during discharging and recharging operations. The cathode drive unit 17 and the fuel-tape transporter 21 are controlled by a system controller 22 so that the metal-fuel tape 13, the cathode structure 14 and ionically-conductive medium are transported at substantially the same velocity at the locus of points at which the ionically-conducing medium contacts the metal-fuel tape and the cathode structure. By controlling the relative movement between the metal-fuel tape, ionically-conductive medium and the cylindrical cathode structure, the system controller 22 effectively minimizes the generation of frictional (e.g. shear) forces therebetween and thus solves the problems associated with such forces.

In general, velocity control among the cathode structure, ionically-conductive medium and metal-fuel tape can be achieved in various ways in the FCB system of FIG. 2. For example, one way would be to drive the cylindrical cathode structure 11 using a belt that is also used to transport the metal-fuel tape 13 (e.g. between supply and take-up reels or hubs within a cassette type-device. Another way would be to drive the cylindrical cathode structure 11 using a first set of DC-controlled motors, while driving the supply and take-up hubs of the fuel cassette device using a second set of DC-controlled motors, synchronized with the first set of DC-controlled motors. Other ways of achieving velocity control will become apparent to those skilled in the art having had the benefit of reading the present disclosure.

In general, it will be desired in most applications to mount a plurality of pairs of "rotatable" cathode and anode contacting elements about the cylindrical cathode structure of the system of FIG. 2. Such an arrangement will enable maximum current collection from each rotating cathode in the system, at the generated output voltage. For clarity of exposition, however, only a single pair of cathode and anode contacting elements are shown mounted about the cathode cylinder in FIG. 2.

Specifically, as shown in FIG. 2, an electrically-conductive "cathode-contacting" element 23 is rotatably supported at each end of the cylindrical cathode structure 11 by a pair of brackets or like structures so that the cathode-contacting element 23 is arranged in electrical contact with the nickel mesh fabric 15 exposed on the outer edge portion 24 thereof and is permitted to rotate about the axis of rotation of the cathode-contacting element as the cylindrical cathode structure is rotated about the axis of rotation of the cylindrical cathode structure. Also as shown in FIG. 2, an electrically-conductive "anode-contacting" element 25 is rotatably supported by a pair of brackets 26 or like structures so that it is arranged closely adjacent the cylindrical cathode structure, in electrical contact with the underside surface of the metal-fuel tape 13, and permitted to rotate about the axis of rotation of the anode-contacting element as the metal-fuel tape is transported over the rotating cathode structure with the ionically-conductive medium disposed therebetween. As shown, the rotatable cathode and anode contacting elements 23 and 25 are electrically connected to electrical conductors (e.g. wiring) 27 and 28 which are terminated at an output power controller 29. In turn, the electrical load is connected to the output power controller 29 for receiving a supply of electrical power from the FCB system.

As shown in FIG. 2, oxygen-rich air is permitted to flow through the hollow central bore 11A formed through the cylindrical cathode structure 11 by passive diffusion, or by active forcing action created by a fan, turbine, or like structure. During tape discharging operations, the oxygen-rich air is permitted to flow through the perforations 12 formed in the cathode structure and reach the interface between ionically-conductive medium (e.g. electrolyte) 30 and the metal-fuel tape.

In the illustrative embodiment shown in FIG. 2, the ionically-conductive medium 30 is realized as an ionically-conductive fluid or viscous gel applied in the form of a thin film over the outer surface of the cathode cylinder 11. The ionically-conductive fluid/gel 30 can be applied to the surface of the cathode element or metal-fuel tape in either a continuous or periodic manner to ensure that ionically-conductive medium is sufficiently replenished during system operation and thus maintain an optimum level of hydroxide ion concentration at the interface between the ionically-conductive medium and metal-fuel tape. Notably, the required thickness of the ionically-conductive film layer will vary from application to application, but typically will depend on a number of factors including, for example, the electrical conductivity of the ionically-conductive medium, the current flow expected to be produced by the FCB system during discharging operations, the surface area of the cathode element, and the like.

Ionically-conductive fluid/gel 30 can be made using the following formula. One mole of potassium hydroxide (KOH) and one mole of calcium chloride are dissolved in 100 grams of water. The function of KOH is to provide a hydroxide ion source, whereas the function of calcium chloride is as a hygroscopic agent. Thereafter, one-half a mole of polyethylene oxide (PEO) is added to the mixture as an ion carrier. The mixture is then blended for about 10 minutes. Thereafter, 0.1 mole of cellulose methoxycarboxylic acid, a gellant, is added to the blended mixture. This formula results in the generation of an ionically-conductive gel suitable for application to the surface of the cathode element 14 or metal-fuel tape 13 of the FCB system.

Alternatively, ionically-conductive medium 30 can be realized as a solid-state ionically-conductive film applied to the outer surface of the cylindrical cathode element 14, or the inner surface of the metal-fuel tape. In this alternative embodiment of the present invention, the solid-state ionically-conductive film can be formed on the cathode element or the metal-fuel tape using either of the following formulas set forth below.

In accordance with the first formula, one mole of KOH, a hydroxide source, and 0.1 mole of calcium chloride, a hygroscopic agent, are dissolved in the mixed solvents of 60 milliliters of water and 40 milliliters of tetrahydrogen furan (THF). Thereafter, one mole of PEO is added to the mixture as an ion carrier. Then, the resulting solution (e.g. mixture) is cast (i.e. coated) as a thick film onto the outer surface of the cathode element 14, or as a thick film onto the underside surface of the metal-fuel tape 13, whichever the case may be. Using the above formulation, ionically-conductive film can be obtained with a thickness in the range of about 0.2 mm to about 0.5 mm. As the mixed solvents (i.e. water and THF) within the applied film coating are allowed to evaporate, an ionically-conductive solid state film is formed on the outer surface of the cathode element 14, or on the underside surface of the metal-fuel tape, whichever the case may be.

According to the second formula, one mole of KOH and 0.1 mole of calcium chloride are dissolved in the mixed solvents of 60 milliliters of water and 40 milliliters of tetrahydrogen furan (THF). The function of KOH is as an ion source, whereas the function of the calcium chloride is as a hygroscopic agent. Thereafter, one mole of polyvinyl chloride (PVC) is added to the solution in an amount sufficient to produce a gel-like substance. The solution is then cast (coated) as a thick film onto the outer surface of the cathode element 14, or as a thick film onto on the underside surface of the metal-fuel tape, whichever the case may be. Using the above formulation, ionically-conductive film can be obtained with a thickness in the range of about 0.2 mm to about 0.5 mm. As the mixed solvents (i.e. water and THF) within the applied coating are allowed to evaporate, an ionically-conductive solid state film forms on the outer surface of the cathode element 14, or on the underside surface metal-fuel tape, as the case may be.

When using the ionically-conductive media 30 as described hereinabove, it will necessary to provide a means for achieving "wetting" between (1) the ionically-conductive layer 30 and the metal-fuel tape 13, and (2) the ionically-conductive medium 30 and the movable cathode cylinder 11. One way of achieving wetting would be to continuously or periodically apply a coating of water ($H_2O$) and/or electrolyte make-up solution to the surface of the metal-fuel tape 13 (and/or ionically-conductive medium 30) during system operation to enable a sufficient level of ionic transport between the metal-fuel tape 13 and the ionically-conductive medium 30 and also between the movable cathode cylinder 11 and the ionically-conductive medium 30. Notably, the thickness of the water coating applied to the metal-fuel tape (and/or the ionically-conductive medium) will depend on the transport speed of the metal fuel tape, its water absorption properties, etc. In the illustrative embodiment shown in FIG. 2, wetting of the metal-fuel tape 13 and/or ionically-conductive medium 30 can be carried out using applicator 54 and dispensing mechanism 55. It is understood, however, that other methods of wetting the metal-fuel tape 13 (13', 13") and/or ionically-conductive medium 30 may be used with excellent results.

While the illustrative embodiments schematically depicted in FIG. 1 and described hereinabove are shown for use in single-cathode/single-anode type applications, it is understood that such system embodiments can be readily modified to include a plurality of electrically-isolated cathode elements formed about the plastic support cylinder 11 for use with multi-track metal-fuel tape of the type taught in Applicant's a copending application Ser. Nos. 09/074,337 and 08/944,507, supra. The primary advantage of such system modifications is that it will be possible to deliver electrical power at various output voltage levels required by particular electrical loads.

Second Illustrative Embodiment of the FCB System

In the second illustrative embodiment of the FCB system shown in FIGS. 2 through 2C, is similar to the FCB system shown in FIG. 2 except that the metal-fuel tape employed in the FCB System of FIG. 3 has a solid-state ionically-conductive coating 31 applied to the underside surface thereof, and not on the outer surface of the cathode structure as shown in FIG. 2.

In this alternative embodiment of the present invention, the metal-fuel tape employed in the FCB System of FIG. 3 can be realized in a variety of different ways. As shown in FIG. 3C1, a first type of metal-fuel tape 13' is formed by applying a ionically-conductive gel or gel-like (i.e. solid-state) layer 31 to the surface of a thin layer of metal-fuel 32. As shown in FIG. 3C2, a second type of metal-fuel tape 13" is formed by embodying an ionically-conductive medium 33 and metal-fuel particles 34 within a substrate material 35. Techniques for fabricating such forms of metal-fuel are described in copending application Ser. No. 09/074,377.

Third Illustrative Embodiment of the FCB System

The third illustrative embodiment of the FCB system shown in FIGS. 4 through 4C, is similar to the FCB system shown in FIG. 1 except that the rotatable anode-contacting element 25 is arranged to establish electrical contact with the outer surface of the metal-fuel tape 13. Consequently, the path of current flow through metal-fuel tape employed in the FCB system of FIG. 4 will be different from the path of current flow through metal-fuel tape employed in the FCB system of FIG. 2. All other respects, the FCB system of FIG. 4 is similar to the FCB system of FIG. 2.

Fourth Illustrative Embodiment of the FCB System

The fourth illustrative embodiment of the FCB system shown in FIGS. 5 through 5C2, is similar to the FCB system shown in FIG. 3 except that the rotatable anode-contacting element 25 is arranged to establish electrical contact with the outer surface of the metal-fuel tape 13', 13".

Consequently, the path of current flow through metal-fuel tape 13', 13" employed in the FCB system of FIG. 5 will be different from the path of current flow through metal-fuel tape employed in the FCB system of FIG. 3. All other respects, the FCB system of FIG. 5 and its embodiments are similar to the FCB system of FIG. 3 and its embodiments.

Fifth Illustrative Embodiment of the FCB System

Figure 6:
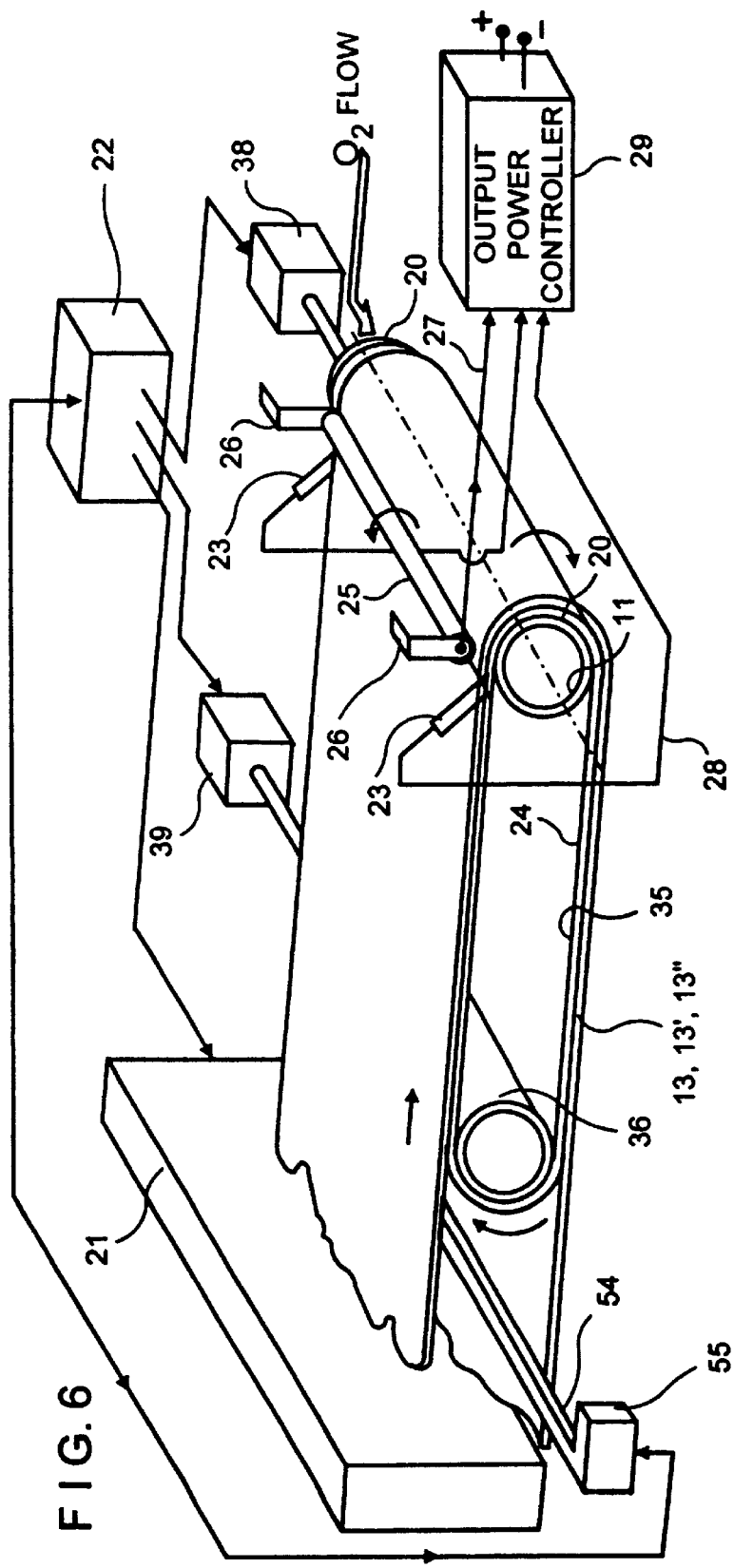
FIG. 6 is a fifth illustrative embodiment of the FCB system, wherein metal-fuel tape is passed over the second embodiment of the cylindrical cathode structure hereof which is driven an angular velocity equalized to the velocity of the metal-fuel tape while an ionically-conductive belt is transported between the metal-fuel tape and the cylindrical cathode structure, and wherein the anode-contacting structure engages the outer surface of the metal-fuel tape.

In FIG. 6, a fifth illustrative embodiment of the FCB system of the present invention is shown. In this illustrative embodiment, the ionically-conductive medium is realized in the form of an ionically-conductive belt structure running between a belt transport cylinder and a cathode cylinder of the general type shown in FIGS. 2, 3, 4, and 5.

As shown in FIG. 6, the ionically-conductive belt 35 is rotatably supported between cathode cylinder 11 as described hereinabove, and a belt transport cylinder 36 made of plastic or other electrically non-conductive material. As shown, a supply of metal-fuel tape 13 is transported over the ionically-conducing belt 35, between a pair of supply and take-up reels as taught in Applicant's copending application Ser. No. 09/074,337.

In the event that the cathode cylinder 11 is employed within a Metal-Fuel Tape Discharging Subsystem, then each of the subsystems contained within the Metal-Fuel Tape Discharging Subsystem disclosed in copending application Ser. No. 09/074,337 can be incorporated into the system schematically depicted in FIG. 6. Thus, as taught in Applicant's copending application Ser. Nos. 09/074,337 and 08/944,507, the interior portion of the cathode cylindrical 11 shown in FIG. 6 can be equipped with an oxygen-injection chamber (connected to an air pump or oxygen source), one or more $pO_2$ sensors, one or more temperature sensors, discharging head cooling equipment, and the like, so that system controller 22 can control the $pO_2$ level within the cathode element 14, as well as maintain the temperature of the discharging head during discharging operations.

Similarly, in the event that the cathode cylinder 11 is employed within a Metal-Fuel Tape Recharging Subsystem, then each of the subsystems contained within the Metal-Fuel Tape Recharging Subsystem disclosed in copending application Ser. No. 09/074,337 can be incorporated into the system schematically depicted in FIG. 6. Thus, as taught in Applicant's copending application Ser. Nos. 09/074,337, the interior portion of the cathode cylindrical 11 shown in FIG. 6 can be equipped with an oxygen-evacuation chamber (connected to a vacuum pump or like device), one or more $pO_2$ sensors, one or more temperature sensors, recharging head cooling equipment, and the like, so that system controller 22 can control the $pO_2$ level within the cathode element 14, as well as maintain the temperature of the recharging head during recharging operations.

As shown in FIG. 6, the cathode cylinder 11 is rotated at a controlled angular velocity by a cathode drive unit 38, while the belt transport cylinder 36 is rotated at a controlled angular velocity by an drive unit 39. The metal-fuel tape 13 is transported over the surface of the ionically-conductive belt 35 and cathode cylinder 11 by operation of tape transport mechanism 21 during discharging and recharging operations.

The drive units 38 and 39 and tape transporter 21 are controlled by system controller 22 so that the metal-fuel tape 13, ionically-conductive belt 35 and the cathode cylinder 11 are maintained at substantially same velocity at the locus of points at which the ionically-conductive belt 35 contacts the metal-fuel tape 13 and the cathode cylinder 11 during system operation. By controlling the relative movement between the metal-fuel tape 13, ionically-conductive belt structure 35 and cylindrical cathode structure 11, the system controller 22 effectively minimizing the generation of frictional forces therebetween and thus reduces the likelihood of damage caused to the cathode element 14 and metal-fuel tape 13.

In general, velocity control can be achieved in various ways in the FCB system of FIG. 6. For example, one way might be to drive the cathode cylindrical 11 and transport cylinder 36 using a belt-like structure that is also used to transport the supply of metal-fuel tape (e.g. between supply and take-up reels or hubs within a cassette type-device). Another way would be to drive the cathode cylinder 11 and transport cylinder 36 with a pair of DC-controlled motors, while driving the supply and take-up hubs of the fuel cassette device using a second pair of DC-controlled motors, synchronized with the first pair of DC-controlled motors. Other ways of achieving velocity control will become apparent to those skilled in the art.

In general, it will be desired in most applications to mount a plurality of pairs of "rotatable" cathode and anode contacting elements about the cathode cylinder of the system of FIG. 6. Such an arrangement will enable maximum current collection from each rotating cathode in the system, at the generated output voltage. For clarity of exposition, however, only a single pair of cathode and anode contacting elements are shown mounted about the cathode cylinder in FIG. 6.

As shown in FIG. 6, a electrically-conductive "cathode-contacting" element 23 is rotatably supported at each end of cathode cylinder 11 by a pair of brackets so that cathode-contacting element 23 is arranged in electrical contact with the exposed nickel mesh fabric 20 on the edge portions of the cathode cylinder 11 as the cathode cylinder is rotated about its axis of rotation. Also, an electrically-conductive "anode-contacting" element 25 is rotatably supported by brackets 26 that are arranged closely adjacent the cathode cylinder, in electrical contact with the outerside surface of the metal-fuel tape 13, as cathode cylinder is rotated about its axis of rotation. The cathode and anode contacting elements 23 and 25 are electrically connected to electrical conductors (e.g. wiring) 28 and 28 which are terminated at an output power controller 29. An electrical load can be connected to the output terminals of the output power controller 29 in order to receive a supply of electrical power generated within the FCB system.

As shown in FIG. 6, oxygen-rich air is permitted to flow through the hollow central bore 11 A formed through the cylindrical cathode structure 11 by passive diffusion, or by active forcing action created by a fan, turbine, or like structure. During tape discharging operations, the oxygen-rich air is permitted to flow through the perforations 12 formed in the cathode structure 11 and reach the interface between the metal-fuel tape and the ionically-conductive belt structure 35.

Figure 6D:
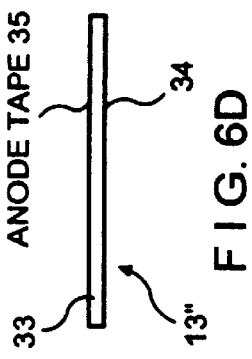
FIG. 6D is a across-sectional view of a section of a third type of metal-fuel tape that can be used in the system of FIG. 6, realized by impregnating metallic powder within a substrate material.
Figure 6C:
FIG. 6C is a cross-sectional view of a section of a second type of metal-fuel tape that can be used in the system of FIG. 6, realized by depositing metallic powder and binder on a substrate.
Figure 6B:
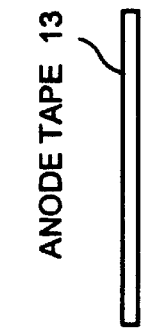
FIG. 6B is a cross-sectional view of a section of a first type of metal-fuel tape that can be used in the system of FIG. 6, realized in the form of thin layer of metal fuel.
Figure 6A:
FIG. 6A is a cross-sectional view of the ionically-conductive belt structure shown in FIG. 6.

In the illustrative embodiment shown in FIGS. 6 and 6A, the ionically-conductive belt 35 can be realized as flexible belt having ionic-conduction characteristics. Such a belt can be made from an open-cell polymer material having a porous structure and impregnated with an ionically-conductive material (e.g. KOH) capable of supporting ionic transport between the cathode and anode structures of the FCB system. In general, there will be many ways of making the ionically-conductive belt. For purposes of illustration, two formulas are described below.

In accordance with the first formula, one mole of KOH and 0.1 mole of calcium chloride are dissolved in the mixed solvents of 60 milliliters of water and 40 milliliters of tetrahydrogen furan (THF). The function of KOH is as a hydroxide ion source, whereas calcium chloride is as a hygroscopic agent. Thereafter, one mole of PEO is added to the mixture. Then, the solution is cast (or coated) as a thick film onto substrate made of polyvinyl alcohol (PVA) type plastic material. This material has been found to work well with PEO, although it is expect that other substrate materials having a surface tension higher than the film material should work as well with acceptable results. As the mixed solvents evaporate from the applied coating, an ionically-conductive solid state membrane (i.e. thick film) is formed on the PVA substrate. By peeling the solid state membrane off the PVA substrate, a solid-state ionically-conductive membrane or film is formed. Using the above formulation, it is possible to form ionically-conductive films having a thickness in the range of about 0.2 to about 0.5 millimeters. Then, the solid-state membrane can be cut into a shape required to form a belt-like structure transportable about two or more rotating cylinders. The ends of the shaped membrane can be joined by an adhesive, ultra-sonic welding, appropriate fasteners or the like to form a solid-state ionically-conductive belt structure 35 for use in the FCB systems of the present invention.

In accordance with the second formula, one mole of KOH and 0.1 mole of calcium chloride are dissolved in the mixed solvents of 60 millimeters of water and 40 milliliters of tetrahydrogen furan (THF). The function of KOH is as a hydroxide ion source, whereas calcium chloride is as a hygroscopic agent. Thereafter, one mole of polyvinyl chloride (PVC) is added to the mixture. Then, the resulting solution is cast (or coated) as a thick film onto substrate made of polyvinyl alcohol (PVA) type plastic material. This material has been found to work well with PVC, although it is expect that other substrate materials having a surface tension higher than the film material should work as well with acceptable results. As the mixed solvents evaporate from the applied coating, an ionically-conductive solid state membrane (i.e. thick film) is formed on the PVA substrate. By peeling the solid state membrane off the PVA substrate, a solid-state ionically-conductive membrane is formed. Using the above formulation, it is possible to form ionically-conductive films having a thickness in the range of about 0.2 to about 0.5 millimeters. Then, the solid-state film or membrane can be cut into a shape required to form a belt-like structure transportable about two or more rotating cylinders. The ends of the shaped membrane can be joined by an adhesive, ultra-sonic welding, appropriate fasteners or the like to form a solid-state ionically-conductive belt structure 35 for use in the FCB systems of the present invention.

When using the ionically-conductive belt 35 described hereinabove, it will necessary to provide a means for achieving "wetting" between (1) the ionically-conductive belt 35 and the metal-fuel tape 13 (13', 13"), and (2) the ionically-conductive belt 35 and the rotatable cathode cylinder 11. One way of achieving wetting would be to continuously or periodically apply a coating of water ($H_2O$) and/or electrolyte make-up solution to the surface of the metal-fuel tape (and/or ionically-conductive belt) during system operation to enable a sufficient level of ionic transport between the metal-fuel tape and the ionically-conductive belt and also between the movable cathode cylinder and the ionically-conductive belt. Notably, the thickness of the water coating applied to the metal-fuel tape (and/or the ionically-conductive belt) will depend on the transport speed of the metal fuel tape, its water absorption properties, etc. In the illustrative embodiment shown in FIG. 6, wetting of the metal-fuel tape and/or ionically-conductive belt can be carried out using applicator 54 and dispensing mechanism 55. It is understood, however, that other methods of wetting the metal-fuel tape and/or ionically-conductive belt may be used with excellent results.

While the illustrative embodiment shown in FIG. 6 is designed for single-cathode/single-anode type applications, it is understood that this system embodiment can be readily modified to include a plurality of electrically-isolated cathode elements formed about the cathode support cylinder for use with multi-track type metal-fuel tape, as taught in Applicant's copending application Ser. No. 08/944,507, supra.

In this alternative embodiment of the present invention, the metal-fuel tape for use in the FCB System of FIG. 6 can be realized in a variety of different ways. As shown in FIG. 6B, a first type of metal-fuel tape 13 is formed as a thin layer of metal-fuel material (e.g. zinc). A second type of metal-fuel tape 13' is formed by depositing a metallic powder (e.g. zinc powder) and binder (e.g. PVC) 31 on a polyester substrate 32. As shown in FIG. 6D, a third type of metal-fuel tape 13" is formed by impregnating metallic powder 33 (e.g. zinc powder) within a substrate material 34 such as PVC. Techniques for fabricating such forms of metal-fuel are described in copending application Ser. No. 09/074,337.

Sixth Illustrative Embodiment of the FCB System

In FIG. 7, a sixth illustrative embodiment of the FCB system of the present invention is shown. In this illustrative embodiment, the moving cathode structure is realized as a cathode belt structure 40 running between a pair of cylindrical rollers 41 and 42, over which a supply of metal-fuel tape 13 (13', 13") is transported.

As shown in FIG. 7, the cathode belt structure 40 is rotatably supported between cylindrical rollers 41 and 42 driven by drive units 38 and 39, while a supply of metal-fuel tape 13 (13', 13") is transported over the cathode belt structure 40 and between a pair of supply and take-up reels as taught in Applicant's copending application Ser. No. 09/074,337. The drive units 38 and 39 and metal-fuel tape transporter 21 are controlled by system controller 22 so that the velocity of both the metal-fuel tape 13 (13',13") and the cathode belt structure 40 are maintained at substantially the same velocity at the locus of points which the ionically conducing medium contacts the metal-fuel tape and the cathode structure during system operation. By controlling the relative movement between the metal-fuel tape and cathode belt structure between cylindrical rollers 41 and 42, the system controller 22 effectively minimizes the generation of frictional forces therebetween and thus reduces wearing and tearing of the metal-fuel tape 13.

The cathode belt 40 has ultrafine perforations in the surface thereof to permit oxygen transport to the anodic metal-fuel tape 13 (13',13") passing thereover. A preferred method of making the flexible cathode structure is to blend black Carbon powder (60%/weight), with a binder material such as Teflon emulsion(T-30 from Dupont) (20%/weight), and catalyst material such as magnesium dioxide $MnO_2$ (20%/weight) within 100 milliliters of water (solvent) and surfactant (e.g Triton X-10 from Union Carbide) 2.0%/weight in order to make a slurry. Then the slurry is cast or coated onto the nickel sponge (or mesh fabric material). The slurry-coated nickel mesh fabric is then air dried for about 10 hours. Thereafter, dried article is compressed at 200 [pounds/cm$^2$] in to form flexible cathodic material having a desired porosity (e.g. 30–70%) and about 0.5–0.6 millimeters. It is understood, however, that the thickness and porosity of the cathode material may vary from application to application. The cathode material is then sintered at about 280 degree C for about 2 hours to remove the solvent (i.e. water) and provide a flexible sheet of cathodic material which can then be cut into the desired dimensions to form a cathode belt structure for the FCB system under design. The ends of belt structure can be joined by soldering, fasteners, or the like to form a virtually seamless cathode surf ace about closed belt structure. The nickel mesh material can be exposed at the ends of the cathode belt structure 40 to allow cathode contacting elements 48 to establish electrical contact therewith during discharging and recharging operations.

When using the ionically-conductive media 53 described hereinabove, it will necessary to provide a means for achieving "wetting" between (1) the ionically-conductive medium 53 and the metal-fuel tape 13 (13', 13"), and (2) the ionically-conductive medium 53 and the movable cathode belt 40. One way of achieving wetting would be to continuously or periodically apply a coating of water ($H_2O$) to the surface of the metal-fuel tape (and/or ionically-conductive medium 53) during system operation to enable a sufficient level of ionic transport between the metal-fuel tape and the ionically-conductive medium 53 and also between the movable cathode belt 40 and the ionically-conductive medium 53. Notably, the thickness of the water coating applied to the metal-fuel tape 13 (and/or the ionically-conductive medium 53) will depend on the transport speed of the metal fuel tape 13, its water absorption properties, etc. In the illustrative embodiment shown in FIG. 7, wetting of the metal-fuel tape and/or ionically-conductive medium 53 can be carried out using applicator 54 and dispensing mechanism 55. It is understood, however, that other methods of wetting the metal-fuel tape and/or ionically-conductive medium 53 may be used with excellent results.

In general, velocity control can be achieved in various ways in the FCB system of FIG. 7. For example, one way might be to drive transport cylinders 41 and 42 with a belt structure that is also used to transport the metal-fuel tape 13 (e.g. between supply and take-up reels or hubs within a cassette type-device). Another way might be to drive transport cylinders 41 and 42 with a first pair of DC-controlled motors, while driving the supply and take-up hubs of the metal-fuel cassette device using a pair of DC-controlled motors, synchronized with the first and second DC speed-controlled motors. Other ways of achieving velocity control will become apparent to those skilled in the art.

In general, it will be desired in most applications to mount a plurality of pairs of "rotatable" cathode and anode contacting elements about the cathode belt structure of the system of FIG. 7. Such an arrangement will enable maximum current collection from each cathode belt structure in the system, at the generated output voltage. For clarity of exposition, however, only a single pair of cathode and anode contacting elements are shown mounted along the cathode belt structure in FIG. 7.

As shown in FIG. 7, the electrically-conductive "cathode-contacting" element 48 is rotatably supported by a pair of brackets 49 so that it is arranged in electrical contact with the exposed nickel mesh fabric 45 on the edge portions of the cathode belt structure 40 as it is transported between transport cylinders 41 and 42. Also, an electrically-conductive "anode-contacting" element 50 is rotatably supported by brackets 49, above the metal-fuel tape 13 (13', 13") and opposite the cathode contacting element 48, so that anode-contacting element establishes electrical contact with the outerside surface of the metal-fuel tape, as shown in FIG. 7. The cathode and anode contacting elements 48 and 50 are electrically connected to electrical conductors (e.g. wiring) which are terminated at an output power controller 29. An electrical load can be connected to the output terminals of the output power controller 29 in order to receive a supply of electrical power generated within the FCB system.

In the event that the cathode belt 40 is employed within a Metal-Fuel Tape Discharging Subsystem, then each of the subsystems contained within the Metal-Fuel Tape Discharging Subsystem disclosed in copending application Ser. No. 09/074,337 can be incorporated into the system schematically depicted in FIG. 7. Thus, as taught in Applicant's copending application Ser. Nos. 09/074,337 and 08/944,507, a portion of the cathode belt structure 40 shown in FIG. 7, along which electrical current is generated, can be enclosed by an oxygen-injection chamber (connected to an air pump or oxygen source), and having one or more $pO_2$ sensors, one or more temperature sensors, discharging head cooling equipment, and the like, so that system controller 22 can control the $pO_2$ level within this section of the moving cathode belt structure 40, as well as maintain the temperature of the discharging head therealong during discharging operations.

Similarly, in the event that the cathode belt structure 40 is employed within a Metal-Fuel Tape Recharging Subsystem, then each of the subsystems contained within the Metal-Fuel Tape Recharging Subsystem disclosed in copending application Ser. No. 09/074,337 can be incorporated into the system schematically depicted in FIG. 7. Thus, as taught in Applicant's copending application Ser. Nos. 09/074,337 and 08/944,507, a portion of the cathode belt structure 40 shown in FIG. 7, along which electrical current is generated, can be enclosed by an oxygen-evacuation chamber (connected to a vacuum pump or like device), and having one or more $pO_2$ sensors, one or more temperature sensors, recharging head cooling equipment, and the like, so that system controller 22 can control the $pO_2$ level within this section of the moving cathode belt structure 40, as well as maintain the temperature of the recharging head therealong during recharging operations.

As shown in FIG. 7, during tape discharging operations, oxygen-rich air is permitted or forced to flow through the fine perforations 21 formed in the cathode belt structure 40 and reach the interface between the metal-fuel tape 13', 13", and the ionically-conductive medium (e.g. electrolyte gel) 53. During tape recharging operations, oxygen liberated from the interface between the metal-fuel tape and the ionically-conductive medium (e.g. electrolyte gel) is permitted or forced to flow through the fine perforations 21 formed in the cathode belt structure 40, to the ambient environment.

In the illustrative embodiment shown in FIGS. 7 and 7A, the outer surface of cathode belt structure 40 (i.e facing the metal-fuel tape transported thereover) is coated with a solid-state ionically-conductive film 53 capable of supporting ionic transport between the cathode belt structure 40 and the metal-fuel tape 13 (13',13") transported through the FCB system. Alternatively, the under surface of metal-fuel tape facing the cathode belt structure 40 can be coated with a solid-state ionically-conductive film 53 capable of supporting ionic transport between the cathode belt structure 40 and the metal-fuel material along the transported metal-fuel tape 13 (13', 13"). This approach would enable to the use of a simpler cathode belt structure within the FCB system of this illustrative embodiment.

Another alternative method of supporting ionic transport between the cathode belt structure 40 and the metal-fuel tape 13 (13',13") is to apply a film of an ionically-conductive gel (or liquid) 53 onto the underside surface 13A of the metal-fuel tape as it is being transported over the cathode belt structure 40. This can be achieved using applicator 54, disposed beneath the metal-fuel tape 13 (13', 13"), and fed by dispenser 55 governed by system controller 22. During operation, a thin layer of ionically-conductive gel 53 is dispensed from applicator 54 over the surface of the metal-fuel tape contacting the cathode belt 40. Notably, the required thickness of the ionically-conductive film layer will vary from application to application, but typically will depend on a number of factors including, for example, the electrical conductivity of the ionically-conductive medium, the current flow expected to be produced by the FCB system during discharging operations, the surface area of the cathode element, and the like.

While the illustrative embodiment shown in FIG. 7 is designed for single-cathode/single-anode type applications, it is understood that this system embodiment can be readily modified to include a plurality of electrically-isolated cathode elements (tracks) formed along the flexible cathode belt structures for use with multi-track metal-fuel tape, as taught in Applicant's copending application Ser. Nos. 08/944,507, supra.

In alternative embodiments of the present invention, the metal-fuel tape for use with the FCB system of FIG. 7 can be realized in a variety of different ways. As shown in FIG. 7B, the first type of metal-fuel tape 13 is formed as a thin layer of metal-fuel material (e.g. zinc). The second type of metal-fuel tape 13' shown in FIG. 7C is formed by depositing a metallic powder (e.g. zinc powder) and binder (e.g. polyethylene) 31 on a polyester substrate 32. As shown in FIG. 7D, a third type of metal-fuel tape 13" is formed by impregnating metallic powder 33 (e.g. zinc powder) within a substrate material 34 such as polyvinyl chloride PVC. Techniques for fabricating such forms of metal-fuel are described in copending application Ser. Nos. 08/944,507 and 09/074,337.

During system operation, the cathode belt structure 40 is transported at a controlled velocity between the transport cylinders 41 and 42. Therewhile, the supply of metal-fuel tape 13 (13',13") is transported over the surface of the cathode belt structure 40 at substantially the same velocity that the ionically-conducing medium contacts the metal-fuel tape and the cathode belt structure 40, and enables electrical power generation without slippage or causing damage to the cathode belt structure and metal-fuel tape.

Seventh Illustrative Embodiment of the FCB System

In FIG. 8, a seventh illustrative embodiment of the FCB system is shown which is similar to the FCB system shown in FIG. 7. The primary difference between these two systems is that in FIG. 8, the cathode-contacting element 48 is placed close to the transport cylinder 41 so that it contacts the outer surface of the conductive belt-structure 40, whereas the anode-contacting element 50 is placed closely to the cathode-contacting electrode 48 and establishes contact with the underside of the supply of metal-fuel tape 13 (13',13") being transported over the cathode belt structure 40. Consequently, the path of electrical current flow through metal-fuel tape 13 (13',13") employed in the FCB system of FIG. 8 will be different from the path of current flow through metal-fuel tape 13 (13',13") employed in the FCB system of FIG. 7. All other respects, the FCB system of FIG. 8 is similar to the FCB system of FIG. 7.

Eighth Illustrative Embodiment of the FCB System

In FIG. 9, an eighth illustrative embodiment of the FCB system is shown which is similar to the FCB system shown in FIG. 7. The primary difference between these two systems is that in FIG. 9, the ionically-conductive medium is realized as an ionically-conductive layer formed on the underside of the supply of the metal-fuel tape 13 (13',13"). As shown in FIG. 9B, the first type of metal-fuel tape 58 is formed as a thin layer of metal-fuel material (e.g. zinc) 59, onto which an ionically-conductive layer 60 is laminated. A second type of metal-fuel tape 58' shown in FIG. 9C is formed by depositing a metallic powder (e.g. zinc powder) and binder (e.g. PVC) 61 on a polyester substrate 62, onto which an ionically-conductive layer 60' is laminated. As shown in FIG. 9D, a third type of metal-fuel tape 58" is formed by impregnating metallic powder 63 (e.g. zinc powder) within a substrate material 64 such as PVC, onto which an ionically-conductive layer 60 is laminated. Techniques for fabricating such forms of metal-fuel are described in copending application Ser. Nos. 08/9444,507 and 08/074, 337. All other respects, the FCB system of FIG. 9 is similar to the FCB system of FIG. 7.

Ninth Illustrative Embodiment of the FCB System

FIG. 10 shows a ninth illustrative embodiment of the FCB system of the present invention. In this illustrative embodiment, the cathode structure is realized as a belt structure 40 transported between a first pair of cylindrical rollers 41 and 42 driven by drive units 37 and 38 respectively, in a manner similar to the way shown in FIGS. 7 through 9D. The ionically-conductive medium is realized as an ionically-conductive belt 35 transported between transport cylinder 66 and transport cylinder 42 driven by drive units 62 and 38, respectively, in a manner similar as shown in FIG. 6. A supply of metal-fuel tape 13 (13'.13") is transported over the ionically-conductive belt structure 35 between a pair of supply and take-up reels as taught in Applicant's copending application Ser. Nos. 08/944,507 and 09/074,337. The drive units 38, 39, and 62 as well as tape drive units 21 are controlled by a system controller 22 so that the velocity of both the metal-fuel tape 13, ionically-conductive belt structure 35 and the cathode belt structure 40 are maintained at substantially the same velocity at the locus of points at which the ionically-conducing belt structure 35 contacts the metal-fuel tape and the cathode belt structure 40 during system operation. By controlling the relative movement between the metal-fuel tape, ionically-conductive belt structure 35 and cathode belt structure 40, the system controller 22 minimizes the generation of frictional forces therebetween and thus the problems associated therewith.

In general, velocity control can be achieved in various ways in the FCB system of FIG. 10. For example, one way might be to drive the transport cylinders 41, 42 and 66 using a belt structure that is also used to transport the metal-fuel tape 13 (e.g. between supply and take-up reels or hubs within a cassette type-device). Another way might be to drive transport cylinders 41, 42 and 66 with a first set of DC-controlled motors, while driving the supply and take-up hubs of the metal-fuel cassette device using a different set of DC-controlled motors, synchronized with the first set of DC-controlled motors. Other ways of achieving velocity control among the movable components of the FCB system will become apparent to those skilled in the art.

In general, it will be desired in most applications to mount a plurality of pairs of "rotatable" cathode and anode contacting elements about the cathode belt structure of the system of FIG. 10. Such an arrangement will enable maximum current collection from each moving cathode belt structure in the system, at the generated output voltage. For clarity of exposition, however, only a single pair of cathode and anode contacting elements are shown in FIG. 10.

As shown in FIG. 10, an electrically-conductive "cathode-contacting" element 48 is rotatably supported by a pair of brackets 69 so that it is arranged in electrical contact with the exposed nickel mesh fabric on the outer edge portions of the cathode belt structure 40 as the cathode belt structure is transported about transport cylinder 41. Also, an electrically-conductive "anode-contacting" element 50 is rotatably supported by a pair of brackets 70 disposed above the metal-fuel tape and opposite the cathode contacting element 48, so that the anode-contacting element establishes electrical contact with the outerside surface of the metal-fuel tape 13 (13',13"), as shown in FIG. 10. The cathode and anode contacting elements 48 and 50 are connected to electrical conductors (e.g. wiring) which are terminated at an output power controller 29. An electrical load can be connected to the output terminal of the output power controller 29 in order to receive a supply of electrical power generated within the FCB system.

When using the ionically-conductive belt 35 described hereinabove, it will necessary to provide a means for achieving "wetting" between (1) the ionically-conductive belt and the metal-fuel tape 13 (13", 13"), and (2) the ionically-conductive belt 35 and the movable cathode belt 40. One way of achieving wetting would be to continuously or periodically apply a coating of water ($H_2O$) and/or electrolyte make-up solution to the surface of the metal-fuel tape (and/or ionically-conductive belt) during system operation to enable a sufficient level of ionic transport between the metal-fuel tape and the ionically-conductive belt and also between the movable cathode belt and the ionically-conductive medium. Notably, the thickness of the water coating applied to the metal-fuel tape (and/or the ionically-conductive belt 35) will depend on the transport speed of the metal fuel tape, its water absorption properties, etc. In the illustrative embodiment shown in FIG. 10, wetting of the metal-fuel tape and/or ionically-conductive belt 35 can be carried out using applicator 54 and dispensing mechanism 55 controlled by the system controller 22. It is understood, however, that other methods of wetting the metal-fuel tape 13 (13', 13") and/or ionically-conductive belt 35 may be used with excellent results.

In the event that the cathode belt 40 is employed within a Metal-Fuel Tape Discharging Subsystem, then each of the subsystems contained within the Metal-Fuel Tape Discharging Subsystem disclosed in copending application Ser. No. 09/074,337 can be incorporated into the system schematically depicted in FIG. 10. Thus, as taught in Applicant's co-pending application Ser. Nos. 09/074,337 and 08/944,507, a portion of the cathode belt structure 40 shown in FIG. 10, along which electrical current is generated, can be enclosed by an oxygen-injection chamber (connected to an air pump or oxygen source), and having one or more $pO_2$ sensors, one or more temperature sensors, discharging head cooling equipment, and the like, so that system controller 22 can control the $pO_2$ level within this section of the moving cathode belt structure 40, as well as maintain the temperature of the discharging head therealong during discharging operations.

Similarly, in the event that the cathode belt structure 40 is employed within a Metal-Fuel Tape Recharging Subsystem, then each of the subsystems contained within the Metal-Fuel Tape Recharging Subsystem disclosed in copending application Ser. No. 09/074,337 can be incorporated into the system schematically depicted in FIG. 10. Thus, as taught in Applicant's copending application Ser. Nos. 09/074,337 and 08/944,507, a portion of the cathode belt structure 40 shown in FIG. 10, along which electrical current is generated, can be enclosed by an oxygen-evacuation chamber (connected to a vacuum pump or like device), and having one or more $pO_2$ sensors, one or more temperature sensors, recharging head cooling equipment, and the like, so that system controller 22 can control the $pO_2$ level within this section of the moving cathode belt structure 40, as well as maintain the temperature of the recharging head therealong during recharging operations.

As shown in FIG. 10, during tape discharging operations, oxygen-rich air is permitted or forced to flow through the fine perforations 21 formed in the cathode belt structure 40 and reach the interface between the metal-fuel tape and the ionically-conductive belt 35. During tape recharging operations, oxygen liberated from the interface between the metal-fuel tape and the ionically-conductive belt 35 is permitted or forced to flow through the fine perforations 21 formed in the cathode belt structure 40, to the ambient environment.

While the illustrative embodiment shown in FIG. 10 is designed for single-cathode/single-anode type applications, it is understood that this system embodiment can be readily modified to include a plurality of electrically-isolated cathode elements formed along the cathode belt structure 40 for use with multi-track metal-fuel tape, as taught in Applicant's copending application Ser. Nos. 08/944,507 and 09/074,337, supra.

In alternative embodiments of the present invention, the metal-fuel tape used in the FCB System of FIG. 10 can be realized in a variety of different ways. As shown in FIG. 10C, the first type of metal-fuel tape 13 is formed as a thin layer of metal-fuel material (e.g. zinc). The second type of metal-fuel tape 13' shown in FIG. 10D is formed by depositing a metallic (e.g. zinc) powder and binder (e.g. PVC) 31 on a polyester substrate 32. As shown in FIG. 10E, the third type of metal-fuel tape 13" is formed by impregnating metallic powder (e.g. zinc powder) 33 within a substrate material 34 such as PVC. Techniques for fabricating such forms of metal-fuel are described in copending application Ser. Nos. 08/944,507 and 09/074,337.

During discharging operations, the cathode belt structure 40 is transported at a controlled velocity between transport cylinders 41 and 42, while the ionically-conductive belt structure 35 is transported at a controlled velocity between transport cylinders 41 and 42. Therewhile, a continuous supply of metal-fuel tape 13 (13', 13") is transported over the surface of the cathode belt structure 40 at substantially the same velocity at the locus of points at which the ionically-conducing belt structure 35 contacts the metal-fuel tape and the cathode belt structure 40 without slippage.

Alternative Embodiments of the FCB System of the Present Invention

Having described the illustrative embodiments of the present invention, several modifications thereto readily come to mind which would be advantageous in the commercial practice of the present invention.

In order to eliminate the need to separately drive and actively control the velocity of the metal-fuel tape, movable cathode structure and ionically-conductive medium in the system hereof using complex mechanisms, the present invention also contemplates creating a condition of "hydrostatic drag" (i.e. hydrostatic attraction) between the metal-fuel tape and the ionically-conductive medium (e.g. belt or applied gel/solid-state film), and the ionically-conductive medium (e.g. belt or applied gel/solid-state film and the cathode structure (e.g. cylinder or belt). This condition will enable a more efficient transportation of the metal-fuel tape, ionically-conductive medium and movable cathode structure through the FCB system when transporting only one of these three movable system components (e.g. metal-fuel tape, ionically-conductive medium, or movable cathode structure) using a mechanically (e.g. spring-wound), electrically, or pneumatically driven motor. This reduces the complexity of the system as well as the cost of manufacture thereof. Also, it enables the metal-fuel tape, ionically-conductive medium, and cathode structures to be moved within the system without generating significant frictional (e.g. shear) forces, and thus transporting these moving components using torque-control (or current control) techniques regulated by the ouput power requirements set by electrical loading conditions at any instant in time.

Hydrostatic drag can be created between these system components by maintaining a sufficient level of surface tension between the ionically-conductive medium and the metal-fuel tape, and the ionically-conductive medium and the movable cathode structure during system operation.

When using the ionically-conductive media disclosed hereinabove, sufficient surface tension can be created between the three primary moving components of the FCB system by continuously or periodically applying an even coating of water ($H_2O$) and/or electrolyte make-up solution to the surface of the metal-fuel tape (and/or ionically-conductive medium) so that, during system, operation "wetting" occurs between (1) the ionically-conductive medium and the metal-fuel tape, and (2) the ionically-conductive medium and the movable cathode structure. Notably, the thickness of the water coating and/or electrolyte make-up solution applied to the metal-fuel tape (and/or the ionically-conductive medium) will depend on the transport speed of the metal fuel tape, its water absorption properties, etc. In each of the illustrative embodiments disclosed herein, wetting of the metal-fuel tape and/or ionically-conductive medium can be carried out using applicator 54 and dispensing mechanism 55 shown in the figure drawings hereof. It is understood, however, that other methods of wetting the metal-fuel tape and/or ionically-conductive medium may be used with excellent results.

For example, in the illustrative embodiment shown in FIG. 4, periodic or continuously wetting of the metal-fuel tape 8 and the ionically-conductive coating 30 on the cathode cylinder 11 can create sufficient surface tension therebetween, and thus sufficient hydrostatic drag, to enable the cathode cylinder 11 to passively move (i.e. rotate) at the same velocity as the metal-fuel tape in contact therewith while only the metal-fuel tape is being actively driven by its tape transport mechanism 21. In this alternative embodiment of the present invention, the use of cathode cylinder drive unit 17 and velocity equalization by system controller 22 can be eliminated while still achieving the principles of the present invention. This modification would reduces the complexity of the system as well as its cost of manufacture and maintenance.

In the illustrative embodiment shown in FIG. 5, periodic or continuously wetting of the ionically-conductive coating 30 on the metal-fuel tape 8 and the cathode cylinder It can create sufficient surface tension therebetween, and thus sufficient hydrostatic drag, to enable the cathode cylinder 11 to passively move at the same velocity as the metal-fuel tape in contact therewith while only the metal-fuel tape is being actively driven by its tape transport mechanism 21. In this alternative embodiment of the present invention, the use of cathode cylinder drive unit 17 and velocity equalization by system controller 22 can be eliminated while still achieving the principles of the present invention. This modification would reduces the complexity of the system as well as its cost of manufacture and maintenance.

In the illustrative embodiment shown in FIG. 6, periodic or continuously wetting of the metal-fuel tape 13 (13', 13"), ionically-conductive belt 35, and cathode cylinder 11 can create sufficient surface tension therebetween, and thus sufficient hydrostatic drag, to enable the cathode cylinder 11, belt transport cylinder 36 and ionically-conductive belt 35 to passively rotate at the same velocity as the metal-fuel tape 13 in contact therewith while only the metal-fuel tape 13 is being actively driven by its tape transport mechanism 21. In this alternative embodiment of the present invention, the use of cylinder drive units 38 and 39 and velocity equalization by system controller 22 can be eliminated while still achieving the principles of the present invention. Alternatively, it may be possible in some instances to actively drive the ionically-conductive belt 35 and allow the cathode cylinder 11, and metal fuel tape 13 to passively move at the same velocity as the ionically-conductive belt 35 in contact therewith. In either case, such modifications will reduce the complexity of the system as well as its cost of manufacture and maintenance.

In the illustrative embodiment shown in FIG. 7, periodic or continuously wetting of the metal-fuel tape 13 (13', 13") and the ionically-conductive medium 53 on and cathode belt 40 can create sufficient surface tension therebetween, and thus sufficient hydrostatic drag, to enable the cathode belt 40, belt transport cylinder 41 and ionically-conductive belt 42 to passively rotate at the same velocity as the metal-fuel tape 13 in contact therewith while only the metal-fuel tape 13 is being actively driven by its tape transport mechanism 21. In this alternative embodiment of the present invention, the use of cylinder drive units 38 and 39 and velocity equalization by system controller 22 can be eliminated while still achieving the principles of the present invention. Alternatively, it may be possible in some instances to actively drive the cathode belt 40 and allow the metal fuel tape 13 to passively move at the same velocity as the ionically-conductive medium 53 in contact therewith. In either case, such modifications will reduce the complexity of the system as well as its cost of manufacture and maintenance.

In the illustrative embodiment shown in FIG. 8, periodic or continuously wetting of the metal-fuel tape 13 (13', 13") and the ionically-conductive medium 53 on and cathode belt 40 can create sufficient surface tension therebetween, and thus sufficient hydrostatic drag, to enable the cathode belt 40, belt transport cylinder 41 and ionically-conductive belt 42 to passively rotate at the same velocity as the metal-fuel tape 13 in contact therewith while only the metal-fuel tape 13 is being actively driven by its tape transport mechanism 21. In this alternative embodiment of the present invention, the use of cylinder drive units 38 and 39 and velocity equalization by system controller 22 can be eliminated while still achieving the principles of the present invention. Alternatively, it may be possible in some instances to actively drive the cathode belt 40 and allow the metal fuel tape 13 to passively move at the same velocity as the ionically-conductive medium 53 in contact with the cathode belt and metal-fuel tape. In either case, such modifications will reduce the complexity of the system as well as its cost of manufacture and maintenance.

In the illustrative embodiment shown in FIG. 9, periodic or continuously wetting of the cathode belt 40 and the ionically-conductive medium 53 on the metal-fuel tape 13 (13', 13") can create sufficient surface tension therebetween, and thus sufficient hydrostatic drag, to enable the cathode belt 40, belt transport cylinder 41 and ionically-conductive belt 42 to passively rotate at the same velocity as the metal-fuel tape 13 in contact therewith while only the metal-fuel tape 13 is being actively driven by its tape transport mechanism 21. In this alternative embodiment of the present invention, the use of cylinder drive units 38 and 39 and velocity equalization by system controller 22 can be eliminated while still achieving the principles of the present invention. Alternatively, it may be possible in some instances to actively drive the cathode belt 40 and allow the ionically-conductive medium 53 (and metal fuel tape 13) to passively move at the same velocity as the cathode belt 40 in contact with the ionically-conductive medium 53. In either case, such modifications will reduce the complexity of the system as well as its cost of manufacture and maintenance.

In the illustrative embodiment shown in FIG. 10, periodic or continuously wetting of the metal-fuel tape 13 (13', 13") and the ionically-conductive belt 35 on and cathode belt 40 can create sufficient surface tension therebetween, and thus sufficient hydrostatic drag, to enable the cathode belt 40, ionically-conductive belt 35 and belt transport cylinders 41, 42 and 66 to passively move at the same velocity as the metal-fuel tape 13 in contact with ionically-conductive belt 35 while only the metal-fuel tape 13 is being actively driven by its tape transport mechanism 21. In this alternative embodiment of the present invention, the use of cylinder drive units 38, 39 and 67 and velocity equalization by system controller 22 can be eliminated while still achieving the principles of the present invention. Alternatively, it may be possible in some instances to actively drive the cathode belt 40 (or ionically-conductive belt 35) and allow the metal fuel tape 13 to passively move at the same velocity as the ionically-conductive belt 35 in contact therewith. In either case, such modifications will reduce the complexity of the system as well as its cost of manufacture and maintenance.

In addition, a plurality of cathode cylinders (or cathode belts) of the general type disclosed hereinabove can be rotatably mounted within an array-like support structure as disclosed in Applicant's copending application Ser. No. 09/110,761 entitled "Metal-Air Fuel Cell Battery System Employing a Plurality of Moving Cathode Structures for Improved Volumetric Power Density" filed on the same date herewith, and incorporated herein by reference in its entirety. The cathode support tube of each such cylindrical cathode structure can be driven by a supply of metal-fuel tape transported over the surfaces thereof in accordance with a predefined tape pathway. Transport of the metal-fuel tape can be carried out using a tape transport mechanism similar to that disclosed in Applicant's copending application Ser. No. 091074,337. The ionically-conductive medium can be realized as a solid-state film or layer applied to either the outer surface of each cylindrical cathode structure or the surface of the metal-fuel tape, as described in the various illustrative embodiments described herein. Alternatively, the ionically-conductive medium can be realized as an ionically-conductive belt structure that is transported through the cylindrical cathode array, while disposed between the metal-fuel tape and the surface of the cathode cylinders. Using this system design, it is possible to generate very high electrical power output from physical structures occupying relatively small volumes of space, thereby providing numerous advantages over prior art FCB systems.

The above-described FCB systems of the present invention can be used to power various types of electrical circuits, systems and devices, including, but not limited to, power tools, consumer appliances, stand-alone portable generators, vehicular systems, and the like.

Having described in detail the various aspects of the present invention described above, it is understood that modifications to the illustrative embodiments will readily occur to persons with ordinary skill in the art having had the benefit of the present disclosure. All such modifications and variations are deemed to be within the scope and spirit of the present invention as defined by the accompanying Claims to Invention.

What is claimed is:

1. A metal-air fuel cell battery system for supplying electrical power across first and second output terminals, the system comprising:

a movable cathode structure that is cylindrically shaped and has a hollow center permitting air flow therethrough;

a supply of metal-fuel tape transportable relative to said movable cathode structure;

an ionically-conductive belt structure transported between said movable cathode structure and at least a portion of said metal-fuel tape, for contacting said movable cathode and said metal-fuel tape and supporting ionic conduction therebetween during system operation; and a transport mechanism including a first means for transporting said supply of metal-fuel tape relative to said movable cathode structure, a second means for moving said movable cathode structure relative to and at substantially the same velocity as said metal-fuel tape during system operation, and a third means for transporting said ionically-conductive belt structure between said movable cathode structure and said metal-fuel tape during system operation, at substantially the same velocity as said metal-fuel tape during system operation.

2. A metal-air fuel cell battery system for supplying electrical power across first and second output terminals, the system comprising:

a movable cathode belt structure;

a supply of metal-fuel tape transportable relative to said movable cathode belt structure;

an ionically-conductive belt structure transported between said movable cathode belt structure and at least a portion of said metal-fuel tape, for contacting said movable cathode belt structure and said metal-fuel tape and supporting ionic conduction therebetween during system operation; and a transport mechanism including a first means for transporting said supply of metal-fuel tape relative to said movable cathode belt structure, a second means for moving said movable cathode belt structure relative to and at substantially the same velocity as said metal-fuel tape at the locus of points at which said ionically-conductive belt structure contacts said movable cathode belt structure and said metal-fuel tape during system operation, and a third means for transporting said ionically-conductive belt structure between said movable cathode belt structure and said metal-fuel tape during system operation, at substantially the same velocity as said metal-fuel tape at the locus of points at which said ionically-conductive belt structure contacts said movable cathode belt structure and said metal-fuel tape during system operation.

3. The metal-air fuel cell battery system of claim 2, wherein said first means comprises one or more motors for transporting said movable cathode belt structure, and said second means comprises one or more motors for transporting said metal-fuel tape relative to said movable cathode belt structure.

4. A metal-air fuel cell battery system for supplying electrical power across first and second output terminals, the system comprising:

a movable cathode structure;

a supply of metal-fuel tape transportable relative to said movable cathode structure;

an ionically-conductive belt structure transported between said movable cathode belt structure and at least a portion of said metal-fuel tape, for contacting said movable cathode belt structure and said metal-fuel tape and supporting ionic conduction therebetween during system operation; and a transport mechanism including a first means for transporting said supply of metal-fuel tape relative to said movable cathode structure, a second means for moving said movable cathode belt structure relative to and at substantially the same velocity as said metal-fuel tape at the locus of points at which said ionically-conductive belt structure contacts said movable cathode structure and said metal-fuel tape during system operation, and a third means for transporting said ionically-conductive belt structure between said movable cathode structure and said metal-fuel tape during system operation, at substantially the same velocity as said metal-fuel tape at the locus of points at which said ionically-conductive belt structure contacts said movable cathode belt structure and said metal-fuel tape during system operation.

5. The metal-air fuel cell battery system of claim 4, wherein said first means comprises one or more motors for rotating said movable cathode structure, and said second means comprises one or more motors for transporting said metal-fuel tape relative to said movable cathode structure.

* * * * *